US010944123B2

(12) United States Patent
Dutta

(10) Patent No.: US 10,944,123 B2
(45) Date of Patent: Mar. 9, 2021

(54) ELECTRICAL ENERGY GENERATION IN FLUIDIC CHANNELS AND MEMBRANES USING SPONTANEOUS CAPILLARY FLOW

(71) Applicant: University of Wyoming, Laramie, WY (US)

(72) Inventor: Debashis Dutta, Laramie, WY (US)

(73) Assignee: UNIVERSITY OF WYOMING, Laramie, WY (US)

( * ) Notice: Subject to any disclaimer, the term of this patent is extended or adjusted under 35 U.S.C. 154(b) by 245 days.

(21) Appl. No.: 16/141,657

(22) Filed: Sep. 25, 2018

(65) Prior Publication Data

US 2019/0097257 A1    Mar. 28, 2019

Related U.S. Application Data

(60) Provisional application No. 62/562,928, filed on Sep. 25, 2017.

(51) Int. Cl.

| H01M 10/04 | (2006.01) |
| H01M 2/38 | (2006.01) |
| H01M 4/60 | (2006.01) |
| H01M 8/04089 | (2016.01) |
| H01M 8/04186 | (2016.01) |
| H01M 4/02 | (2006.01) |

(52) U.S. Cl.
CPC ............ *H01M 10/04* (2013.01); *H01M 2/38* (2013.01); *H01M 4/602* (2013.01); *H01M 8/04089* (2013.01); *H01M 8/04186* (2013.01); *H01M 2004/021* (2013.01); *H01M 2010/0495* (2013.01)

(58) Field of Classification Search
CPC .................................................. H01M 10/04
See application file for complete search history.

(56) References Cited

U.S. PATENT DOCUMENTS

| 3,682,239 A | * | 8/1972 | Abu-Romia | ............ F28D 15/04 |
| | | | | 165/104.26 |
| 2010/0101934 A1 | * | 4/2010 | Saykally | ................... C01B 3/08 |
| | | | | 204/157.52 |

OTHER PUBLICATIONS

Burgreen et al. (1965) "Efficiency of Pumping and Power Generation in Ultrafine Electrokinetic Systems," J. Appl. Mech. 32(3): 675-679.
Hänni-Ciunel et al. (2007) "Water Contact Angle on Polyelectrolyte-Coated Surfaces: Effects of Film Swelling and Droplet Evaporation," Soft Materials 5(2-3): 61-73.
(Continued)

*Primary Examiner* — Matthew J Merkling
(74) *Attorney, Agent, or Firm* — Leydig, Voit & Mayer, Ltd.

(57) ABSTRACT

Described herein are systems and methods for the generation of electric current and/or electric potential utilizing micro- or nano-channels and capillary flow, including fluidic or microfluidic batteries and electrochemical cells. The provided systems and methods use capillary force to promote fluid flow through micro- and nano-fluidic channels by evaporating fluid at one terminus of the channel, and the resulting fluid flow generates electric potential and or current. Advantageously, the described systems and methods remove the need for pressurized vessels or external pumps, increasing net energy generation and decreasing complexity and size of potential fluidic batteries.

22 Claims, 26 Drawing Sheets

(56) References Cited

OTHER PUBLICATIONS

Lucas (1918) "Ueber das Zeitgesetz des kapillaren Aufstiegs von Flüssigkeiten," Kolloid Z. 23(1): 15-22.
Yang et al. (2004) "Electrokinetic Power Generation via Streaming Potentials in Microchannels: A Mobile-Ion-Drain Method to Increase Streaming Potentials," Proceedings of the 2004 International Conference on MEMS, NANO and Smart Systems (ICMENS'04): 1-5.
Arun et al. (2014) "A paper based self-pumping and self-breathing fuel cell using pencil stroked graphite electrodes," Lab Chip 14(10): 1661-1664.
Bentien et al. (2013) "Evaluation of Nanoporous Polymer Membranes for Electrokinetic Energy Conversion in Power Applications," J. Phys. Chem. C 117(4): 1582-1588.
Bien et al. (2003) "Characterization of masking materials for deep glass micromachining," J. Micromech. Microeng. 13(4): S34-S40.
Cate et al. (2015) "Recent Developments in Paper-Based Microfluidic Devices," Anal. Chem. 87(1): 19-41.
Chun et al. (2005) "Microfluidic analysis of electrokinetic streaming potential induced by microflows of monovalent electrolyte solution," J. Micromech. Microeng. 15(4): 710-719.
Dutta (2011) "Solutel transport in rectangular nanochannels under pressure-driven flow conditions," Microfluid. Nanofluid. 10(3): 691-696.
Elizalde et al. (2015) "Rational design of capillary-driven flows for paper-based microfluidics," Lab Chip 15(10): 2173-2180.
Haldrup et al. (Jan. 2016) "Tailoring Membrane Nanostructure and Charge Density for High Electrokinetic Energy Conversion Efficiency," ACS Nano 10(2): 2415-2423.
Jacobson et al. (1995) "Fused Quartz Substrates for Microchip Electrophoresis," Anal. Chem. 67(13): 2059-2063.
Kilsgaard et al. (2014) "High figure of merit for electrokinetic energy conversion in Nafion membranes," J. Power Sources 247: 235-242.
Kinde et al. (2013) "A Microfluidic SPLITT Device for Fractionating Low-Molecular Weight Samples," Anal. Chem. 85(15): 7167-7172.
Kinde et al. (2015) "Electrophoretic Extraction of Low Molecular Weight Cationic Analytes from Sodium Dodecyl Sulfate Containing Sample Matrices for Their Direct Electrospray Ionization Mass Spectrometry," Anal. Chem. 87(5): 2702-2709.
Lynn et al. (2009) "Passive microfluidic pumping using coupled capillary/evaporation effects," Lab Chip 9(23): 3422-3429.
Merian et al. (2012) "Development and surface characterization of an electrowetting valve for capillary-driven microfluidics," Collids Surf. A 414: 251-258.
Miller et al. (1956) "Physical Theory for Capillary Flow Phenomena," J. Appl. Phys. 27(4): 324-332.
Morrison et al. (1965) "Electrokinetic Energy Conversion in Ultrafine Capillaries," J. Chem. Phys. 43(6): 2111-2115.
Nie et al. (2015) "A microfluidic device based on an evaporation-driven micropump," Biomed. Microdevices 17: 47, 12 pp.
Olthuis et al. (2005) "Energy from streaming current and potential," Sensor Actuat B-Chem 111-112: 385-389.
Osterle (1964) "Electrokinetic Energy Conversion," J. Appl. Mech. 31(2): 161-164.
Pompano et al. (2012) "Control of Initiation, Rate, and Routing of Spontaneous Capillary-Driven Flow of Liquid Droplets through Microfluidic Channels on SlipChip," Langmuir 28(3): 1931-1941.
Reyes et al. (2002) "Micro Total Analysis Systems. 1. Introduction, Theory, and Technology," Anal. Chem. 74(12): 2623-2636.
Richards (1931) "Capillary conduction of liqiuds through porous mediums," J. Appl. Phys. 1(5): 318-333.
Tsougeni et al. (2010) "'Smart' polymeric microfluidics fabricated by plasma processing: controlled wetting, capillary filling and hydrophobic valving," Lab Chip 10(4): 462-469.
Van Der Heyden et al. (2007) "Power Generation by Pressure-Driven Transport of Ions in Nanofluidic Channels," Nano Lett. 7(4): 1022-1025.
Van Der Heyden et al. (2005) "Streaming Currents in a Single Nanofluidic Channel," Phys. Rev. Lett. 95(11): 116104, 4 pp.
Wadsworth et al. (2010) "Nanochannel arrays as supports for proton exchange membranes in microfluidic fuel cells," J. Power Sources 195(11): 3636-3639.
Washburn (1921) "The Dynamics of Capillary Flow," Phys. Rev. 17(3): 273-283.
Xie et al. (2008) "Electric energy generation in single track-etched nanopores," Appl. Phys. Lett. 93(16): 163116, 4 pp.
Xu et al. (2008) "A microfluidic flow injection system for DNA assay with fluids driven by an on-chip integrated pump based on capillary and evaporation effects," Lab Chip 8(10): 1658-1663.
Yang et al. (2011) "Dynamics of Capillary-Driven Flow in Open Microchannels," J. Phys. Chem.C 115(38): 18761-18769.
Yang et al. (2003) "Electrokinetic microchannel battery by means of electrokinetic and microfluidic phenomena," J. Micromech. Microeng. 13(6): 963-970.
Yetisen et al. (2013) "Paper-based microfluidic point-of-care diagnostic devices," Lab Chip 13(12): 2210-2251.
Zimmermann et al. (2007) "Capillary pumps for autonomous capillary systems," Lab Chip 7: 119-125.
Zimmermann et al. (2005) "Continuous flow in open microfluidics using controlled evaporation," Lab Chip 5(12): 1355-1359.
U.S. Appl. No. 16/360,611, filed Mar. 21, 2019.

\* cited by examiner

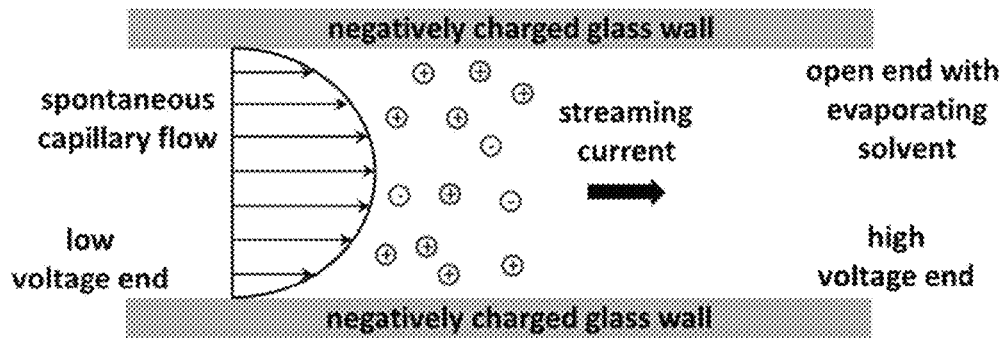
FIG. 20A
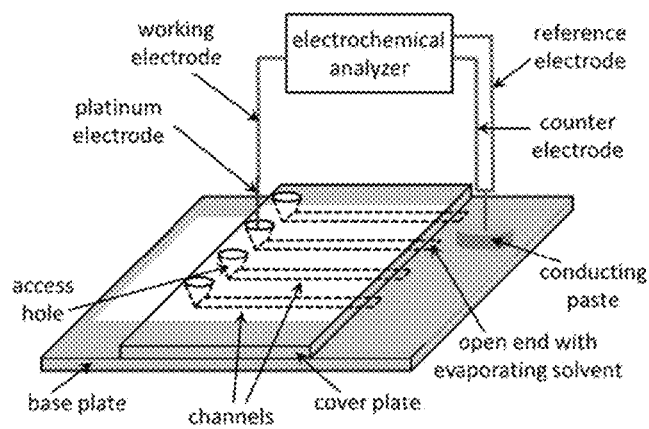 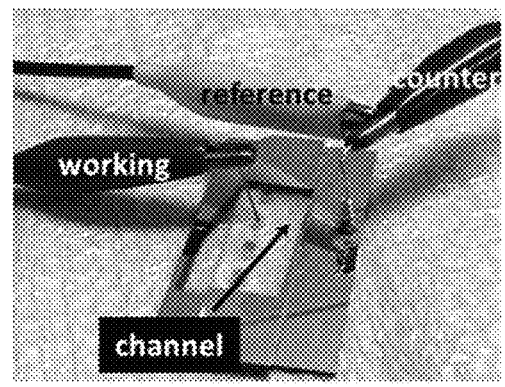
FIG. 20B        FIG. 20C

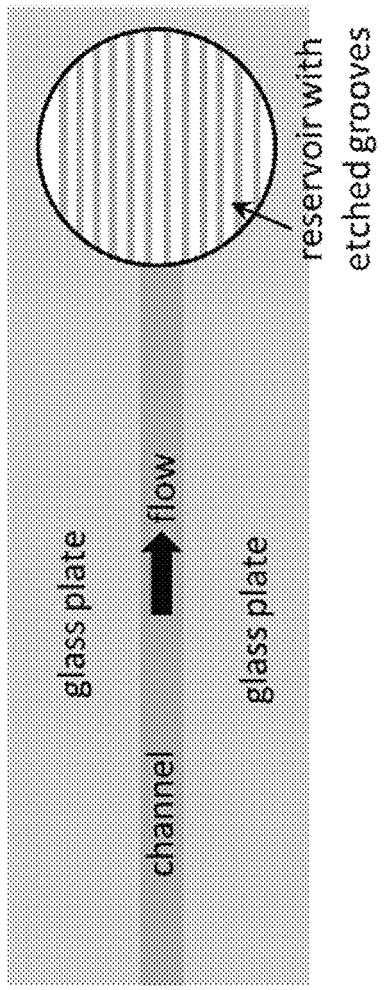
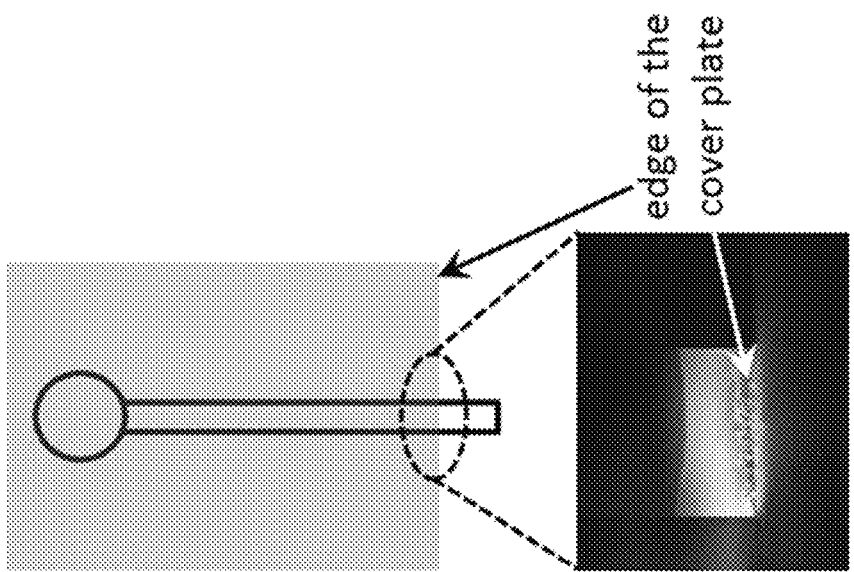
FIG. 22B
FIG. 22C
FIG. 22A

ELECTRICAL ENERGY GENERATION IN FLUIDIC CHANNELS AND MEMBRANES USING SPONTANEOUS CAPILLARY FLOW

CROSS-REFERENCE TO RELATED APPLICATIONS

This application claims the benefit of priority of U.S. Provisional Application Ser. No. 62/562,928 filed Sep. 25, 2017, which is hereby incorporated by reference in its entirety, to the extent not inconsistent herewith.

BACKGROUND OF INVENTION

Advances in fluidic techniques enabling precise control over liquid transport in micro- and nano-fluidic channels have spurred the development of fluidic battery devices which convert fluid motion into electrical power. Fluidic batteries are attractive as inexpensive, miniature and portable sources of electrical power for a variety of applications. Moreover, the life-cycle of fluidic batteries, from fabrication to end-of-life, may have a minimal environmental footprint, due to the absence of combustion of fossil fuels and, in some cases, batteries which do not require rare or toxic materials.

Fluidic batteries take advantage of an electrokinetic phenomenon called "streaming potential," or conversely, "streaming current." A liquid, containing dissolved positive and negative ions, in contact with a charge surface (e.g., inner wall of a glass tube) develops a charge gradient called an electrical double layer. For liquid flowing over a negatively charged surface, positively charged ions are attracted the surface forming a first layer of the electrical double layer. In response to the first layer of positive ions, a diffuse second layer including a higher concentration negative ions forms in the solution. The second, diffuse, layer is more susceptible to fluid motion than the first layer. Flow of the liquid induces motion of the negative ions of the second ion layer in the direction of flow, thereby forming a streaming potential and a streaming current along the direction of flow.

Conventional fluidic batteries utilize an external pump or pressurized vessel to drive liquid flow within micro- or nano-channels, limiting net power generation potential by requiring an energy input. Additionally, use of an external pump or a pressurized vessel limits the miniaturization, and thus portability, of the fluidic battery. An external pump potentially introduces moving parts that increase device complexity and limit device lifetime. Furthermore, an external pump, or a pressure vessel, introduces additional power loss mechanisms at the interface between the pump (or vessel) and the micro- or nano-fluidic channels.

The systems and methods described herein address one or more disadvantages of conventional fluidic battery technologies by eliminating the need for an external pump or pressurized vessel. As such, the present system and methods increases efficiency and practicality of fluidic batteries while providing for further miniaturization.

SUMMARY OF THE INVENTION

Described herein are systems and methods for the generation of electric current and/or electric potential utilizing micro- or nano-channels and capillary flow, including fluidic or microfluidic batteries and electrochemical cells. The provided systems and methods use capillary force to promote fluid flow through micro- and nano-fluidic channels by evaporating fluid at one terminus of the channel, and the resulting fluid flow generates electric potential and or current. Advantageously, the described systems and methods remove the need for pressurized vessels or external pumps, increasing net energy generation and decreasing complexity and size of potential fluidic batteries.

The provided systems may use charged membranes to generate streaming potential and/or streaming current along the length of a channel. Given the small size of the channel and lack of pumping mechanism, a plurality of channels may form an array which provides the ability to generate additional current/potential in a confined space. Various membranes may be utilized in order to provide charge to the walls or surfaces of the channel and additional techniques may promote evaporation and capillary flow through the channel.

In an aspect, provided is a microfluidic electrochemical system comprising: i) a fluid inlet for introduction of an aqueous solvent; ii) a microfluidic channel in fluid communication with the fluid inlet; wherein the microfluidic channel has charged walls; and wherein the microfluidic channel has an average length of greater than or equal to 1 µm and an effective cross sectional diameter of less than or equal to 10 µm; and iii) an evaporation chamber in fluid communication with the microfluidic channel; wherein evaporation of the solvent in the evaporation chamber drives flow of the solvent through the microfluidic channel due to capillary force thereby generating an electrical current flowing through the solvent in the direction of the microfluidic channel. In some embodiments, microfluidic channel may refer to a planar surface over which a fluid flows towards an evaporation chamber, wherein the charged wall is the planar surface. In an embodiment, for example, microfluidic channel refers to a pore of a membrane, wherein the fluid flows across and through the membrane. In embodiments, for example, the microfluidic channel has an average length greater than or equal to 50 µm, greater than or equal to 100 µm, or optionally, greater than or equal to 500 µm. In embodiments, for example, the microfluidic channel has an effective cross sectional diameter less than or equal to 1 µm or less than or equal to 500 nm.

In an embodiment, the fluid inlet is positioned at an opposite end of the microfluidic channel from the evaporation chamber. In an embodiment, the microfluidic electrochemical system further comprises a first electrode positioned proximate to the fluid inlet and a second electrode positioned proximate to the evaporation chamber.

In an embodiment, for example, the microfluidic electrochemical system further comprises a plurality of fluid inlets operably connected to a plurality of microfluidic channels operably connected to at least one evaporation chamber configured to form a microfluidic channel array; wherein the array is configured such that evaporation of the solvent in the at least one evaporation chamber drives flow of the solvent through each of the microfluidic channel due to capillary force thereby generating an electrical current flowing through each of the microfluidic channels. In an embodiment, each of the microfluidic channels is in fluidic communication with an individual fluid inlet. In embodiments, the microfluidic electrochemical system further comprises a plurality of evaporation chambers; wherein each of the microfluidic channels is in fluidic communication with an individual evaporation chamber. In embodiments, the microfluidic channel array comprises greater than or equal to 20 microchannels, greater than or equal to 100 microchannels, or optionally, greater than or equal to 500 microchannels.

Microfluidic channels described herein may be optimized to provide increased ion separation during flow. For example, charged membranes may be included along the wall or walls of the microfluidic channels to enhance streaming current and streaming potential generation. Membrane charges may be increased or decreased to provide ion separation while increasing system longevity or expected lifetime.

In an embodiment, aid microfluidic channel is negatively, or alternatively positively charged. In embodiments, the microfluidic channel comprises a charged membrane positioned along a surface of the microfluidic channel, for example, a sulfonated membrane such as a sulfonated polystyrene membrane. In an embodiment, for example, the charged membrane is Nafion, a sulfonated polystyrene membrane or any combination thereof. Inclusion of a membrane may increase the potential difference (voltage) between to the two electrodes.

Various substrates and solvents may provide additional functionality to the described electrochemical systems and methods. For example, flexible substrates may increase durability and reduce the risk of breaking or disruption of the microfluidic channel, or in the case of arrays, channels. Substrates may also promote capillary flow, for example, by reducing friction in the channel. Solvents may evaporate at lower temperatures or provide more consistent evaporation rates, while providing concentrations of ions to promote streaming current and streaming potential.

In an embodiment, for example, the microfluidic channel is supported by or embedded in a substrate. In embodiments, the substrate is a glass plate, a borosilicate glass plate, silicon, a polymer or a combination thereof. In embodiments, the substrate is a polymer selected from the group consisting of: polymethyl methacrylate (PMMA), polydimethylsiloxane (PDMS), polyethylene terephthalate (PET), polycarbonate, polystyrene and a combination thereof. In an embodiment, the microfluidic channel array is supported by or embedded in a substrate.

In embodiments, the solvent is selected from the group consisting of: water, deionized water; NaCl, KCl, LiCl, methanol, ethanol any combination thereof. In embodiments, the evaporation chamber further comprises a polyelectrolyte coating to increase a rate of evaporation of the solvent, for example, polydiallyldimethylammonium chloride (PDADMA). In an embodiment, the evaporation chamber further comprises a patterned surface to increase the rate of evaporation of the solvent. In an embodiment, the patterned surface comprises grooves having an average width of less than or equal to 25 µm, less than or equal to 10 µm, or optionally, less than or equal to 1 µm. In an embodiment, the patterned surface comprises groves having an average depth of less than or equal to 100 µm, less than or equal to 50 µm, or optionally, less than or equal to 10 µm.

Introduction of a gradient (e.g. a thermal or ion concentration gradient) along the length of the microfluidic channel or alternatively across the inlet and outlet of the membrane may increase the voltage generated by the spontaneous capillary flow. For example, a temperature gradient may increase the open circuit voltage by 10%, 20% or in some cases 50%. The gradient may also provide additional benefits, for example, increased rate of evaporation of the solvent or a viscosity profile which provides increased voltage generation. In an embodiment, the microfluidic channel is configured to provide a gradient along the axial length of the microfluidic channel. In an embodiment, the microfluidic channel array is configured to provide a gradient along the axial length of the plurality of microfluidic channels. In embodiments, the gradient is a temperature gradient or an ionic concentration gradient.

In an aspect, provided herein is a microfluidic electrochemical system comprising: a microfluidic channel array comprising: i) a plurality of fluid inlets for introduction of an aqueous solvent; ii) a plurality of microfluidic channels each in fluid communication with one of the fluid inlets; wherein each of the microfluidic channels has charged walls; and wherein each of the microfluidic channels has an average length of greater than or equal to 1 µm and an effective cross sectional diameter of less than or equal to 10 µm; iii) an evaporation chamber in fluid communication with the microfluidic channels; iv) a first electrode proximate to the fluid inlets and in electrical communication with the microfluidic channels; and v) a second electrode proximate to the evaporation chamber and in electrical communication with the microfluidic channels; wherein evaporation of the solvent in the evaporation chamber drives flow of the solvent through the microfluidic channels due to capillary force thereby generating an electrical current flowing through the solvent in the direction of the microfluidic channel.

The descriptions and limitations regarding properties and compositions, including physical dimensions, membrane and solvent compositions, additional coating and geometries to promote evaporation, etc. apply to each aspect, system and method described herein. In an aspect, provided is a method for generating electrical energy using any of the systems described herein.

In an aspect, provided is a method for generating electrical energy comprising: i) providing a microfluidic electrochemical cell comprising: a) a fluid inlet for introduction of an aqueous solvent; b) a microfluidic channel in fluid communication with the fluid inlet; wherein the microfluidic channel has charged walls; and wherein the microfluidic channel has an average length of greater than or equal to 1 µm and an effective cross sectional diameter of less than or equal to 10 µm; c) an evaporation chamber in fluid communication with the microfluidic channel; d) a first electrode proximate to the fluid inlets and in electrical communication with the microfluidic channels; and e) a second electrode proximate to the evaporation chamber and in electrical communication with the microfluidic channels; and ii) evaporating the solvent in the evaporation chamber thereby flowing the solvent through the microfluidic channel by capillary force; wherein the flow of the solvent generates an electrical current flowing through the solvent in the direction of the microfluidic channel; and wherein the electrical current generates a potential difference between the first electrode and the second electrode.

In an aspect, provided is a microfluidic electrochemical system comprising: i) a microfluidic channel array comprising: a) a plurality of fluid inlets for introduction of an aqueous solvent; b) a plurality of microfluidic channels each in fluid communication with one of the fluid inlets; wherein each of the microfluidic channels has charged walls; wherein each of the microfluidic channels has an average length of greater than or equal to 1 µm and an effective cross sectional diameter of less than or equal to 10 µm; and wherein the microfluidic channel array is configured to provide a gradient along an axial length of the plurality of microfluidic channels; ii) a charged membrane in fluid communication with the microfluidic channel array; iii) an evaporation chamber in fluid communication with the microfluidic channel; wherein evaporation of the solvent in the evaporation chamber drives flow of the solvent through the microfluidic channel due to capillary force thereby generating an electrical current flowing through the solvent in the direction of the microfluidic channel.

In an embodiment, the microfluidic channel array is configured to provide a gradient across the charged membrane. In embodiments, the gradient is a temperature gradient or an ion concentration gradient. In an embodiment, the charged membrane is Nafion, a sulfonated polystyrene membrane or any combination thereof. In an embodiment the charged membrane is positioned proximate to the evaporation chamber.

In an aspect, provided is a microfluidic electrochemical system comprising: i) a fluid inlet for introduction of an aqueous solvent; ii) a charged membrane supported by a substrate and in fluid communication with fluid inlet; wherein the substrate is configured to provide a gradient along a flow path of the charged membrane; iii) an evaporation chamber in fluid communication with the charged membrane; wherein evaporation of the solvent in the evaporation chamber drives flow of the solvent charged membrane along the flow path due to capillary force thereby generating an electrical current flowing through the solvent in the direction of the flow path. In an embodiment, the gradient is a temperature gradient or an ion concentration gradient.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

BRIEF DESCRIPTION OF THE DRAWINGS

FIG. 20A is a schematic describing the operation of the microfluidic electrochemical cells described in this proposal. FIG. 20B is a schematic of the exemplary microfluidic electrochemical cell used in exemplary preliminary work. FIG. 20C is a photograph of an exemplary microfluidic electrochemical cell used in exemplary preliminary work. The yellow regions in FIG. 20B and FIG. 20C correspond to the Cr/Au layer deposited on the glass plate using a dual metal evaporator system for making electrical contact with the open edge of the channel.

FIG. 22A is an illustration and an image of accumulation of Rhodamine B at the open edge of a 1 µm deep channel upon evaporation of the solvent (deionized water) from this region in an exemplary microfluidic electrochemical cell. The image shown is taken after flowing a 0.1 µM solution of the dye for nearly 7 minutes. FIG. 22B is an illustration showing top view of the channel terminal design to employed in an exemplary microfluidic electrochemical cell. FIG. 22C. is a schematic showing cross-sectional view of the grooves patterned on the bottom surface of the downstream reservoir.

DETAILED DESCRIPTION OF THE INVENTION

Figure 1A:
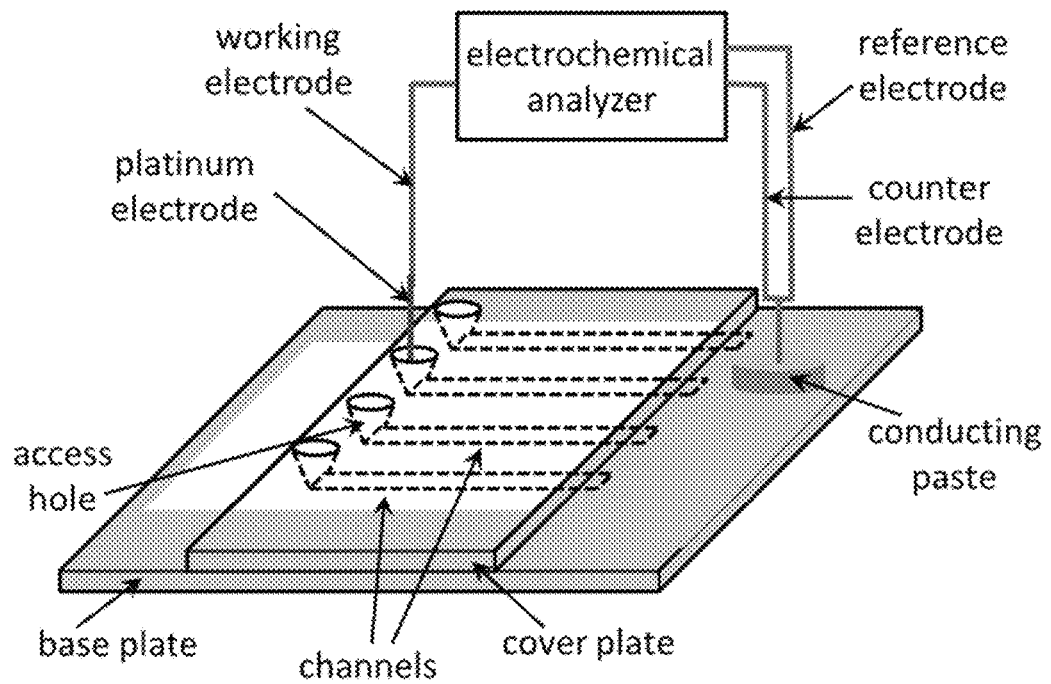
FIG. 1A is an exemplary microfluidic electrochemical cell schematic.

In general, the terms and phrases used herein have their art-recognized meaning, which can be found by reference to standard texts, journal references and contexts known to those skilled in the art. The following definitions are provided to clarify their specific use in the context of the invention.

The term "microfluidic electrochemical cell" refers to a battery, device, system, and/or cell that employs an electrochemical or electrokinetic phenomenon during its operation. In some embodiments, microfluidic channels are micro- or nano-channels, for example, channels having an effective diameter of less than or equal to 500 µm, less than or equal to 10 µm, less than or equal to 1 µm, or optionally, less than or equal to 500 nm. The term electrokinetic phenomenon refers to a category of effects or behavior characterizing fluids having particles or chemical species, optionally charged particles or chemical species, moving past a surface. An example of electrokinetic phenomenon is streaming potential/current, which is further described herein. The microfluidic electrochemical systems (and cells) described herein may employ one or more electrokinetic phenomena such as streaming potential/current.

The terms "solvent" and "aqueous solvent" refer to a liquid which acts as a ion conductor allowing for the transport of ions. Solvents useful in the described systems and methods include solvents which evaporate, including those which evaporate at or around atmospheric temperatures. Solvents may also flow due to capillary force which placed in fluid communication with channels having relatively small effective diameters, for example, micro- and nano-channels.

As used herein, the term "membrane" refers to a material is charged (positively or negatively) and is capable of transporting ionic species (i.e., cations or anions), including protons. According to any of the embodiments disclosed herein, a membrane may be a proton exchange membrane (e.g., a polymer capable of conducting protons). A membrane may be formed of one or more polymers, in any ratio.

For example, a membrane may be formed, at least in part, of nitrocellulose. For example, a membrane may be formed of one or more sulfonated polymers, and optionally one or more non-sulfonated polymers. A sulfonated polymer refers to a polymer having one or more sulfone and/or sulfonate functional groups. For example, a membrane may be formed of sulfonated polystyrene, or derivatives thereof. For example, a membrane may be formed of sulfonated polyethylene, or derivatives thereof. For example, a sulfonated polyethylene polymer is sulfonated tetrapolyethylene (also referred to as Nafion). Optionally, a membrane is formed of one or more polymers, in any ratio, and one or more additives (e.g., organic and/or inorganic dopants, impurities, or non-polymeric materials). For example, at least one of the one or more polymers forming a membrane may be a thermoplastic.

As used herein, the term "polymer" refers to a molecule composed of repeating structural units connected by covalent chemical bonds. A polymer may have one or more repeating units (e.g., equal to or greater than 3 repeating units, optionally, in some embodiments equal to or greater than 10 repeating units, in some embodiments greater or equal to 30 repeating units). A polymer may have high molecular weight (e.g. greater than or equal to 5,000 Da, in some embodiments greater than or equal to 20,000 Da or greater than or equal to 100,000 Da). Polymers are commonly the polymerization product of one or more monomer precursors. The term polymer includes homopolymers, or polymers consisting essentially of a single repeating monomer subunit. The term polymer also includes copolymers which are formed when two or more different types of monomers are linked in the same polymer. Copolymers may comprise two or more monomer subunits, and include random, block, alternating, segmented, grafted, tapered and other architectures. Useful polymers include organic polymers that may be in amorphous, semi-amorphous, crystalline or semi-crystalline states.

The term "weight-average molecular weight" (Mw) refers to the average molecular weight defined as the sum of the products of the molecular weight of each polymer molecule (Mi) multiplied by its weight fraction (wi): Mw=ΣwiMi. As is customary and well known in the art, peak average molecular weight and number average molecular weight may also be used to characterize the molecular weight of the distribution of polymers within a sample.

As used herein, the term "group" may refer to a functional group of a chemical compound. Groups of the present compounds refer to an atom or a collection of atoms that are a part of the compound. Groups of the present invention may be attached to other atoms of the compound via one or more covalent bonds. Groups may also be characterized with respect to their valence state. The present invention includes groups characterized as monovalent, divalent, trivalent, etc. valence states.

As used herein, a "coating" may refer to a material on a surface, particularly a material coated on a surface that is in contact with an electrolyte and/or solvent. The coating may be in the form of a film. According to certain embodiments, a coating may be used to tune (e.g., accelerate) evaporation of a solvent and/or electrolyte. Evaporation rate of a solvent and/or electrolyte may affect the rate of flow in a microfluidic channel, thereby affecting the electrical current output, for example, of a microfluidic electrochemical system. In an embodiment, the electrochemical system comprises a coating is formed of polydiallyldimethylammonium chloride (PDADMA), for example, to enhance evaporation from a reservoir chamber thereby promoting capillary flow.

The terms "conduit", "duct", and "channel" may be used interchangeably to refer to a microfluidic channel. A microfluidic channel may be, for example, a groove, cavity, void, opening, or trench. In certain embodiments, a microfluidic channel may be planar cavity or void. Exemplary microfluidic channels include semicircular, semi oval, polygonal channels. In an embodiment, for example, the channel may be a planar surface in which a membrane forms the plane. In an embodiment, channel refers to pores of a membrane.

Example 1: Electrical Energy Generation in a Glass Channel Using Spontaneous Capillary Flow The use of external pumps or pressurized vessels to drive electrolytes through micro- and nano-fluidic channels presents a significant limitation in the practical use of fluidic batteries that operate based on the streaming current/potential phenomenon. The present disclosure addresses this limitation by employing spontaneous capillary flow to drive the noted transport process instead. An exemplary microfluidic electrochemical cell with an individual glass channel is fabricated to demonstrate such a battery with one of its channel terminals left open to the ambience to facilitate liquid evaporation. In this situation, a steady pressure-gradient can be produced and sustained in exemplary system through continuous vaporization of the solvent (water) at the open edge of the conduit driving the needed electrolyte flow. An electrochemical analyzer is employed to measure the electrical voltage and current produced by the microfluidic electrochemical system (e.g., battery or device, having one or more exemplary microfluidic cells described herein) under different operating conditions allowing quantitative assessment of its performance. The energy conversion efficiency of exemplary microfluidic electrochemical cell is observed to increase for shallower glass channels and lower ionic strength electrolytes consistent with previous scientific literature. In an example, a maximum electrical power output of 127 pW is measured upon flowing deionized water through a 1 μm deep conduit (microfluidic channel) which also yields the largest spontaneous capillary flow velocity for the ambient temperature (25±1° C.) and relative humidity (27.1±3.0%) chosen for exemplary experiments.

Capillary flow of liquid streams offers an effective mean for transporting fluid and analyte samples through micro-/nanometer sized structures without the need for employing external pumps.[1-3] Over the past decade or so, this power-free nature of material transport has been particularly exploited in microfluidic paper-based analytical devices (μPADs) for the design of simple and inexpensive sensors suitable for biomedical diagnostic, environmental monitoring and food/beverage safety inspection measurements outside of the laboratory settings:[4,5] In addition, the co-current capillary flow of a fuel and oxidant stream has been recently utilized for sustained electrical power generation in a paper based fuel cell.[6] Despite these promising developments, the performance of conventional μPADs and their applicability to sophisticated sample analysis procedures remains limited by ability to dynamically control the magnitude and direction of capillary flows. Nevertheless, innovative approaches are being continually developed to address this issue by either modifying the channel geometry and their surface properties[7-16] or integrating active elements such as heaters and valves around the flow paths.[11,12]

In addition to facilitating material transport, liquid flow through micro- and nanometer scaled structures remarkably can be also exploited for energy conversion purposes. For example, upon pumping an electrolyte solution through a channel with a net surface charge an electrical current (streaming current) is produced due to the migration of the counter-ions in the Debye layer.[13-15] As a result of this charge separation, a voltage difference is generated across the channel terminals that drives an ionic current opposing its streaming counterpart. At equilibrium, the streaming potential developed across the ends of the conduit produces just enough ionic current to completely nullify the charge transport through the system. The end result is a fluidic battery (e.g., microfluidic electrochemical cell) that converts mechanical energy of the flowing electrolyte into electrical energy capable of driving an external electronic device. Over the past decade, a quantitative understanding of this phenomenon has been developed by applying it to micro- and nanofluidic systems with precisely defined channel structures.[16,17] The use of external means such as a mechanical pump or a pressurized vessel to drive the needed electrolyte flow however, compromises the practical use of this energy conversion platform. Besides limiting the miniaturization and portability of fluidic batteries, such a requirement tends to introduce additional losses in energy conversion efficiency at the interface between the pump/pressurized vessel and the micro-/nanofluidic duct (or, channel).

The present disclosure addresses this limitation of micro-/nanofluidic battery systems by eliminating the need for an external pump or pressurized vessel to drive the liquid flow within their channel structures. We demonstrate the use of spontaneous capillary flow for driving the migration of counter-ions in the Debye layer leading to electrical energy generation in microfluidic electrochemical cells (e.g., fluidic batteries). The noted liquid flow is sustained in exemplary work through continuous evaporation of water at one of the channel terminals producing a steady pressure-gradient in the system.[11,18-20] The amount of electrical power generated by this exemplary microfluidic electrochemical cell is measured by placing electrodes across the conduit that recorded the voltage-drop and current produced by the microfluidic electrochemical system (e.g., fluidic device, or fluidic battery, that includes microfluidic electrochemical cell(s)) using an electrochemical analyzer. As with fluidic batteries driven by an external pump or pressurized vessel, it is observed that the electrical energy generated by exemplary cell is maximized upon use of deionized water as the electrolyte medium. In this situation, the reported approach to generating electricity may be implemented without the use of any expensive and/or caustic chemicals unlike conventional fuel cell/battery systems. Moreover, certain exemplary microfluidic electrochemical systems (cells) do not produce any toxic wastes and/or do not require expensive electro-catalysts and/or membranes, the use of which is optional. But most importantly, it enables the spontaneous generation of electricity based on the streaming current/potential phenomenon without any direct input of energy into the system, and does so in a sustainable way under ambient conditions.

Exemplary system fabrication: For fabricating the microfluidic electrochemical cells/devices employed in this example, bottom and cover plates made from borosilicate glass are purchased from Telic Company (Valencia, Calif.). While the purchased cover plates have both their faces unprotected, the bottom ones have with a thin layer of chromium and photoresist laid down on one of their surfaces. Custom designed photomasks created through Fineline Imaging Inc. (Colorado Springs, Colo.) are used to pattern the desired channel layout onto the bottom plate using standard photolithographic methods.[21,22] A microchip with 4 individual parallel channels (see FIGS. 1A-1B) is used in exemplary experiments with all of the conduits (microfluidic channels) being uniformly wide (500 µm) and deep (0.5-3 µm). The length of these channels is chosen to be 1 cm. After completion of the photo-patterning process, the photoresist layer is cured in microposit developer MF-319 (Rohm and Haas) and the chromium layer removed along the channel network with a chromium etchant (Transene Inc.). The fluidic ducts (or, microfluidic channels) are then etched to the chosen depth using a buffered oxide etchant (Transene Inc.). The protective photoresist and chromium layers on the bottom plate are subsequently removed using the MF-319 and chromium etchant solutions, respectively. Finally, the microfluidic channels are sealed off by first bringing a glass cover plate in contact with the base plate in deionized water and then allowing the two to bond at 550° C. for 12 hrs in a furnace.[23,24] While one end of these sealed conduits (microfluidic channels) is accessed by punching a 1 mm diameter hole on the cover plate using a microabrasive blasting system (Vaniman Manufacturing Co.) prior to the bonding process, the other end terminated well beyond the edge of the cover plate and is therefore open to ambience (see FIG. 1A). The channels and a small region around them are then covered up in the bonded device/cell with an insulating tape leaving the open end of the conduits (microfluidic channels) exposed. This exemplary microfluidic electrochemical system (having one or more exemplary microfluidic electrochemical cells described herein) is later placed in a dual metal evaporator system (Energy Beam Sciences, Inc.) to sequentially deposit a 130 nm layer of chromium followed by a 40 nm layer of gold.[25,26] The insulating tape is subsequently peeled off yielding the device shown in FIG. 1B.

Figure 1B:
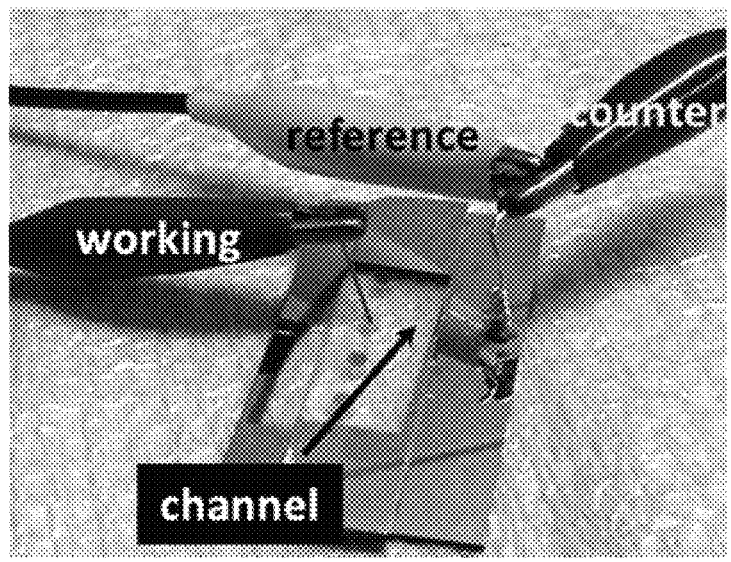
FIG. 1B is a photograph of an exemplary microfluidic electrochemical cell. The yellow regions in FIGS. 1A and 1B correspond to the Cr/Au layer deposited on the glass plate using a dual metal evaporator system for making electrical contact with the open edge of the channel.

Exemplary system procedures and processes: The microfluidic channels in this exemplary system are prepared for an experiment by dipping their open edges in methanol and filling them up with the solvent through application of a mild vacuum at the access holes (e.g., inlets, outlets, and/or other holes along a microfluidic channel). The conduits (channels) are then rinsed with 0.1 N NaOH, deionized water and the relevant electrolyte in that order for 15 min each using the same procedure. The region around the open channel edge is finally dried with a tissue paper and the access hole filled with a drop of the electrolyte before initiating an actual experiment. Streaming potential/current measurements across the glass channel are enabled by electrically connecting the working electrode terminal of an electrochemical analyzer (CH Instruments Inc.) to the electrolyte in the access hole using a platinum wire. The reference and the counter electrode terminals of this analyzer on the other hand, for example, are shorted and connected to the open edge of the channel using an electrically conducting paste (Chemtronics, catalog #CW7100) placed on the gold layer as shown in FIGS. 1A-1B.

Figure 2A:
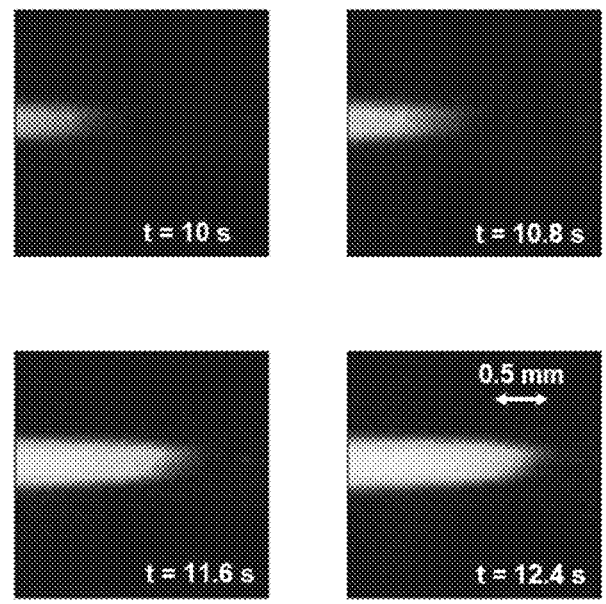
FIG. 2A is a fluorescence image of a traveling Rhodamine B front in a 1 μm deep channel driven by spontaneous capillary flow.
Figure 2B:
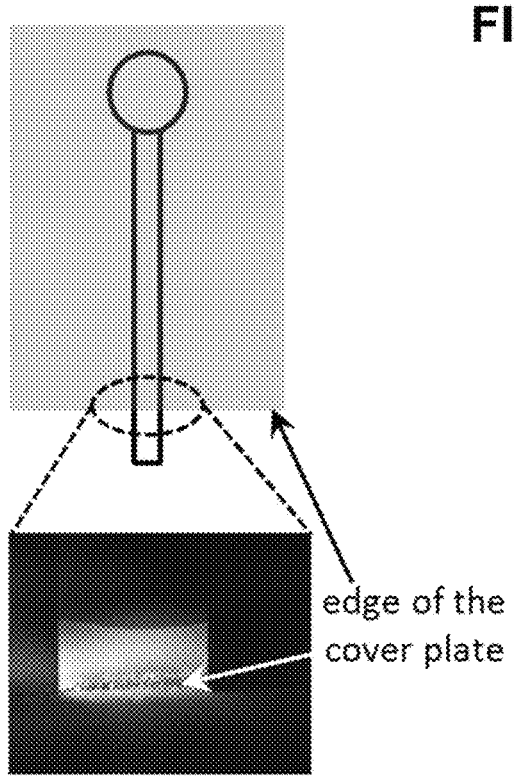
FIG. 2B is an illustration and an image of accumulation of Rhodamine B at the open edge of a 1 μm deep channel upon evaporation of the solvent (deionized water) from this region.
Figure 2C:
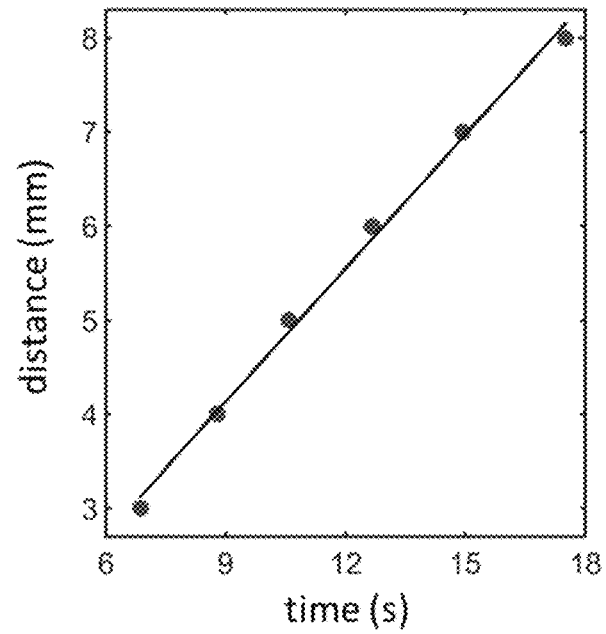
FIG. 2C is a plot of distance traveled by the Rhodamine B front through a 1 μm deep channel as a function of time. The images/data shown in FIG. 2A and FIG. 2C are obtained using a 10 μM solution of Rhodamine B prepared in deionized water. The image shown in FIG. 2B is taken by flowing a 0.1 μM solution of the same dye through a 1 μm deep channel for nearly 7 minutes. The exemplary microfluidic electrochemical cell used to obtain these images/data did not have any Cr/Au layer coated on the glass surface in order to allow better visualization of the dye.
Figure 3A:
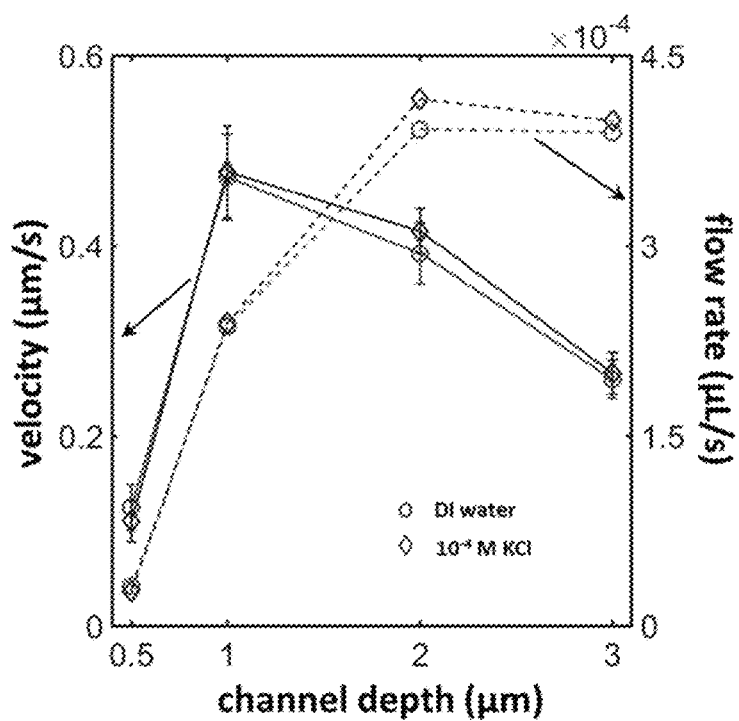
FIG. 3A is a plot of observed variation in the capillary flow velocity (solid line) with channel depth for deionized water and a 0.1 mM KCl solution. The error bars in this data are estimated based on 5 independent measurements. The dotted lines in this figure represent the estimated volumetric flow rate corresponding to these velocity measurements.
Figure 3B:
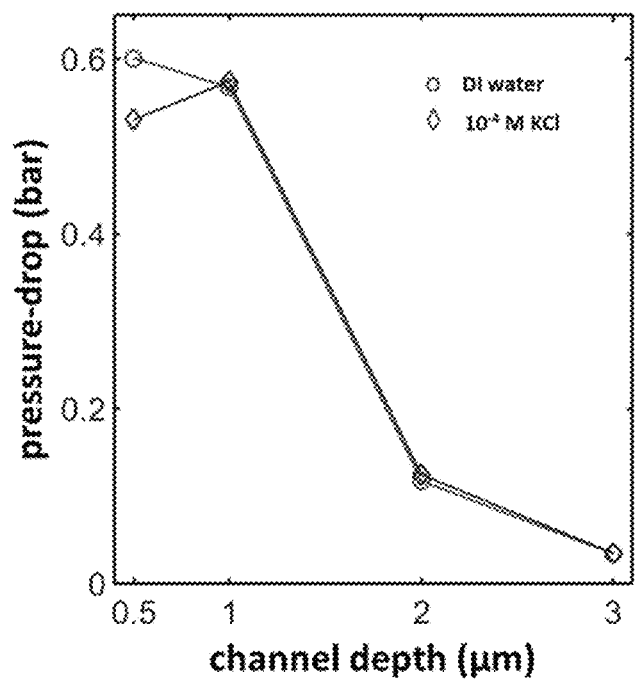
FIG. 3B is a plot of estimated pressure-drop across the fluidic duct (or, channel) in an exemplary microfluidic electrochemical cell as a function of the channel depth.

Exemplary results: Flow characterization: As has been previously stated, the fluid flow needed to produce the streaming potential/current in described exemplary systems rely on spontaneous capillary flow sustained through continuous evaporation of water at the open channel edge. In order to establish that such a flow could indeed be realized in exemplary microfluidic electrochemical system (i.e., battery, device, cell(s)), we perform several experiments in which the neutral tracer, Rhodamine B is added at a concentration of 10 µM to the drop of deionized water placed within the access hole. The transport of the leading edge of this dye solution is then carefully followed to estimate the liquid flow velocity in the channel. It must be pointed out that this flow is monitored in a channel which had been previously filled with dye-free deionized water distinguishing the noted transport process from that observed in the capillary filling of empty micro-/nanoducts (or, microfluidic channels).[1,27,28] In FIG. 2A, we include a series of fluorescence images that depict the advancement of the dyed water solution through a 1 μm deep conduit via spontaneous capillary flow. To further establish such a capillary flow, we also monitored the accumulation of the dye at the open edge of the channel where the solvent (water) evaporated. The fluorescence image included in FIG. 2B confirms this accumulation process and is obtained by flowing a 0.1 μM solution of Rhodamine B prepared in deionized water through a 1 μm deep channel for about 7 min. The migration rate of the advancing dyed water solution shown in FIG. 2A has been quantitated in FIG. 2C yielding a flow velocity of 473 μm/s under the chosen operating conditions. In FIG. 3A, the dependence of this transport rate (u) on channel depth (d) is further assessed for deionized water and a 0.1 mM aqueous solution of potassium chloride (KCl). The figure shows that the quantity u goes through a relatively sharp maximum at d=1 μm for both the chosen fluids. However, the volumetric flow rate corresponding to these velocity measurements is seen to rise monotonically with an increase in d leveling off to a value of about $4\times10^{-4}$ μL/s for conduits deeper than 2 μm. FIG. 3B shows the pressure-drop across exemplary glass channel evaluated as $\Delta P=12\ \eta Lu/d^2$ to decrease sharply for larger values of d which is in agreement with the theoretical predictions by Lynn and Dandy.[20] These pressure-drops are again calculated based on the experimental measurements of u assuming a channel length L=1 cm and liquid viscosity η=1 cP. Experiments reported in this example are performed at an ambient temperature and relative humidity of 25±1° C. and 27.1±3.0%, respectively. Moreover, for the experiments shown in FIGS. 2A-2C and 3A-3B we use microchips that do not have the Cr/Au layer deposited on their surfaces in order to allow better visualization of the dye fluorescence particularly around the open edge of the glass channel.

Figure 4A:
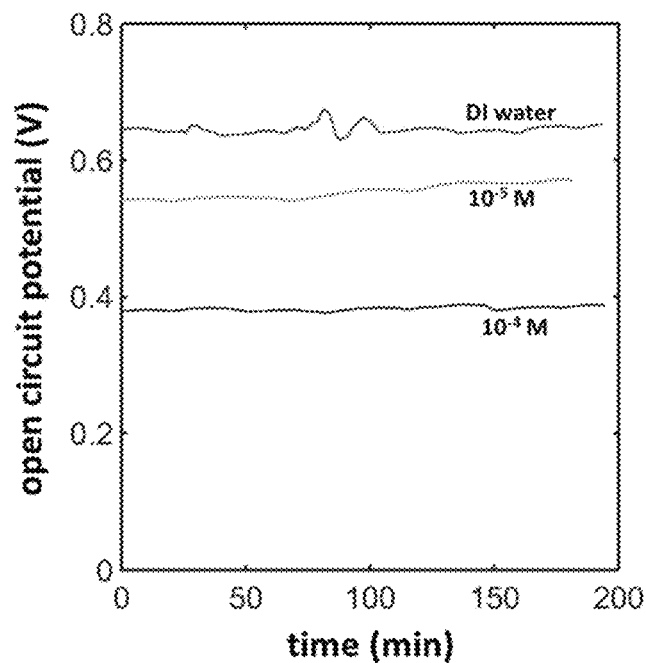
FIG. 4A is a plot of temporal stability in the open circuit potential value recorded for exemplary microfluidic electrochemical cells over time periods longer than 3 hrs.
Figure 4B:
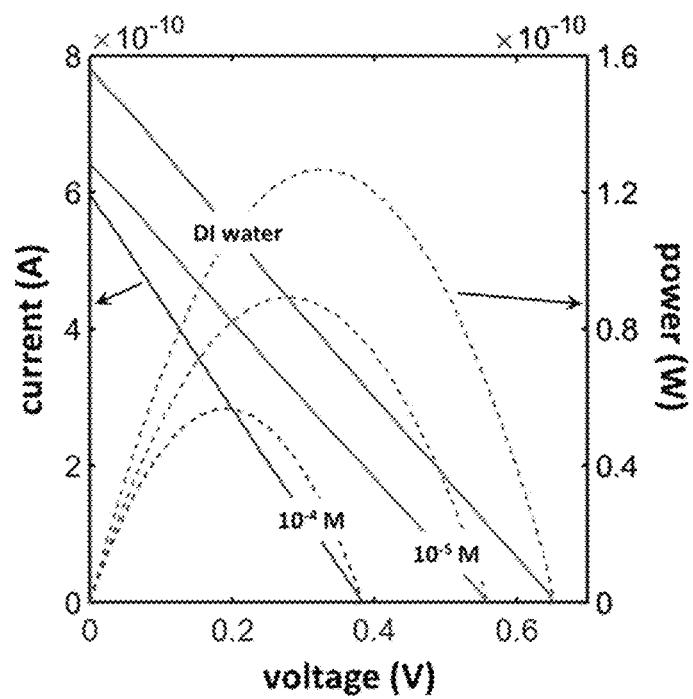
FIG. 4B is a plot of observed relationship between voltage and current (solid lines) produced by an exemplary microfluidic electrochemical cell. The electrical power in this figure (dotted lines) is calculated as the product of the measured voltage and current as recorded by our electrochemical analyzer. The data included in both figures is obtained using a 1 μm deep microfluidic channel. The labels associated with the different curves in the figures indicate whether the solvent (with/without electrolyte) used is deionized water, a $10^{-5}$ M KCl or a $10^{-4}$ M KCl solution.
Figure 5A:
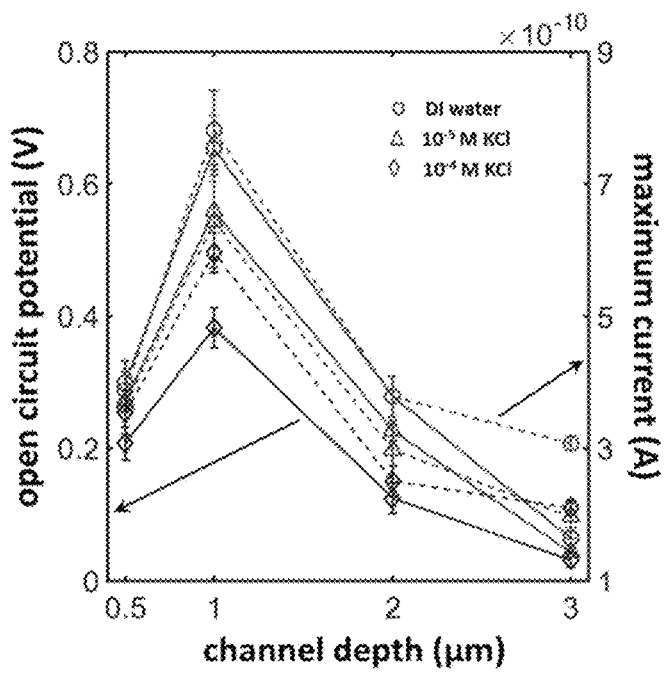
FIG. 5A is a plot of observed variation in the open circuit potential (solid lines) and maximum current (dotted lines) produced by an exemplary microfluidic electrochemical cell with channel depth and salt concentration. The error bars in this data are estimated based on 5 independent measurements.
Figure 5B:
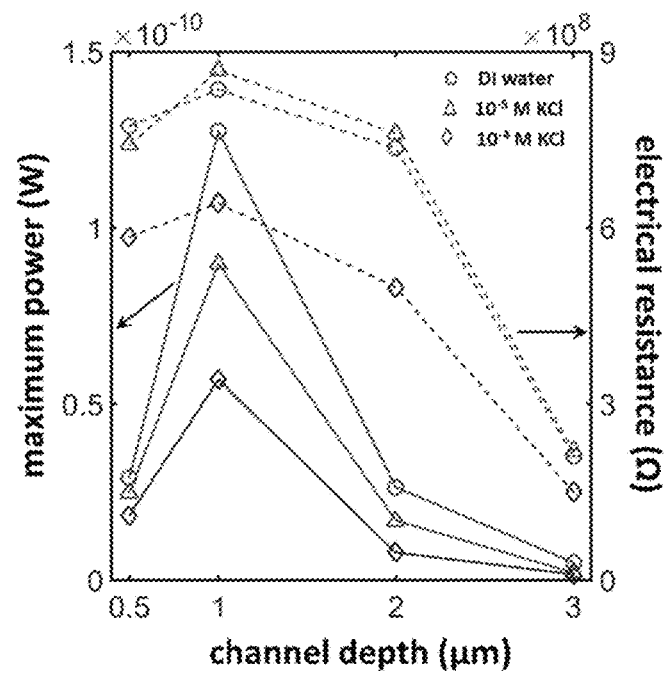
FIG. 5B is a plot showing Maximum electrical power output yielded by an exemplary microfluidic electrochemical cell (solid lines) and its electrical resistance (dotted lines) as estimated based on the measurements included in FIG. 5A.

Exemplary electrical performance: Having established the spontaneous capillary flow in exemplary device, we proceeded to assess its ability to generate electrical power. To this end, we describe the stability in the electrical energy output of exemplary microfluidic electrochemical system (having one or more exemplary microfluidic electrochemical cells) over a time scale on the order of several hours. In FIG. 4A, we have included data obtained from these measurements that are performed in a 1 μm deep channel using deionized water or a KCl solution as the electrolyte medium (and solvent). The figure shows that the open circuit potential recorded for exemplary battery device varied by less than 4% for over 3 hrs establishing the temporal steadiness in its electrical performance. We then focused on characterizing the current-voltage relationship for exemplary fluidic battery (microfluidic electrochemical cells) to quantitatively determine its electrical power output. In FIG. 4B, we have presented the electrical current measured at the terminals of exemplary microfluidic electrochemical battery as a function of the voltage developed across them as recorded by the electrochemical analyzer in exemplary set-up. In this situation, the x-intercept in the graph corresponds to the open circuit potential for the device and the y-intercept provides a measure for the maximum current produced by it when the external load in the circuit is zero. FIG. 4B shows an expected linear variation between this current and voltage upon transporting KCl solutions of different concentrations through a 1 μm deep microfluidic channel. These voltages and currents are also seen to diminish with increasing salt concentrations in the electrolyte in agreement with other streaming current/potential studies reported in the literature.[17] In fact, exemplary experiments show a decrease in the electrical power output of the present exemplary microfluidic electrochemical system (battery) by over a factor of 2 (127 versus 57 pW) going from deionized water to a 0.1 mM KCl solution. FIG. 5A presents a detailed study of the open circuit potential and maximum current measurements for exemplary microfluidic electrochemical system (e.g., device; battery) as a function of the channel depth and salt concentration highlighting a maximum in both these quantities for all electrolytes when d=1 μm. The noted trend is qualitatively consistent with theory which predicts the open circuit potential to scale with the flow velocity in the channel.[29] Based on these measurements, the maximum electrical power output of exemplary microfluidic electrochemical system (e.g., battery; device; having one or more exemplary microfluidic cells described herein) is estimated in FIG. 5B as the product of the open circuit potential and the maximum current in the system divided by a factor 4 that is again seen to maximize at d=1 μm. Similarly, the Ohmic resistance of the channel in exemplary microfluidic electrochemical system is calculated as the ratio of this recorded open circuit potential and maximum current which shows a sharp decline in its magnitude for larger channel depths. The minor increase in the Ohmic resistance going from a 0.5 μm to a 1 μm deep channel as noticed in exemplary results may be a result of the dominating effect of surface conductance in exemplary microfluidic electrochemical system often observed when low conducting electrolytes are filled in glass conduits as is the case in this example study.[39] Finally, in FIG. 6 we have assessed the energy conversion efficiency of exemplary microfluidic electrochemical system based on the measured fluid velocity in its glass channel and the corresponding electric power output. The figure shows a decrease in this quantity for larger channel depths and higher salt concentrations in the electrolyte consistent with previous findings in the literature.[17] In this situation, a maximum energy conversion efficiency of about 1.6% is realized using exemplary battery upon flowing deionized water through a 0.5 μm deep conduit. The high electrical power output in exemplary experiments however is derived from the device with a 1 μm deep channel in spite of its somewhat lower energy conversion efficiency.

In conclusion, in this example, we demonstrate a novel microfluidic electrochemical system that includes one or more microfluidic electrochemical cells that are driven by spontaneous capillary flow of electrolytes through micro- and sub-micrometer deep glass microfluidic channels. Because the noted flow can be sustained by evaporation of the solvent (water) under ambient conditions, it presents an extremely efficient approach to electrical energy generation. In this situation, the energy needed to drive the fluid flow in exemplary battery is spontaneously derived from the environment without the need for external pumps. The capillary flow may be and the generated electrical power may be scaled up through use of an array of channels, pores, cells, etc, for example, and through the use of a membrane, for example, rather than a single conduit as is employed in the example.[31,32] Recent studies also indicate that the electrokinetic energy conversion efficiency of such arrays may be further enhanced through careful optimization of the pore size and surface charge density.[33,34] In addition, the water evaporation rate in these devices may be increased using larger surface areas as well as by operating them in regions with high wind velocities. Adoption of these strategies represents example methods for increasing both the voltage and current produced by the exemplary microfluidic system (cells) described in this example.

REFERENCES

1. E. W. Washburn, *Phys. Rev.,* 1921, 17, 273-283.
2. L. A. Richards, *J. Appl. Phys.,* 1931, 1, 318-333.
3. E. E. Miller and R. D. Miller, *J. Appl. Phys.,* 1956, 27, 324-332.
4. D. M. Cate, J. A. Adkins, J. Mettakoonpitak and C. S. Henry, *Anal. Chem.,* 2015, 87, 19-41.
5. A. K. Yetisen, M. S. Akram and R. L. Lowe, *Lab Chip,* 2013, 13, 2210-2251.
6. R. K. Arun, S. Halder, N. Chanda and S. Chakraborty, *Lab Chip,* 2014, 14, 1661-1664.
7. M. Zimmermann, H. Schmid, P. Hunziker and E. Delamarche, *Lab Chip,* 2007, 7, 119-125.
8. E. Elizalde, R. Urteaga and C. L. A. Berli, *Lab Chip,* 2015, 15, 2173-2180.
9. R. R. Pompano, C. E. Platt, M. A. Karymov and R. F. Ismagilov, *Langmuir,* 2012, 28, 1931-1941.
10. K. Tsougeni, D. Papageorgiou, A. Tserepi and E. Gogolides, *Lab Chip,* 2010, 10, 462-469.
11. M. Zimmermann, S. Bentley, H. Schmid, P. Hunziker and E. Delamarche, *Lab Chip,* 2005, 5, 1355-1359.
12. T. Mérian, F. He, H. Yan, D. Chu, J. N. Talbert, J. M. Goddard and S. R. Nugen, *Colloids Surf. A,* 2012, 414, 251-258.
13. J. F. Osterle, *J. Appl. Mech.,* 1964, 31, 161-164.
14. D. Burgreen and F. R. Nakache, *J. Appl. Mech.,* 1965, 32, 675-679.
15. F. A. Morrison and J. F. Osterle, *J. Chem. Phys.,* 1965, 43, 2111-2115
16. F. H. J. van der Heyden, D. Stein and C. Dekker, *Phys. Rev. Lett.,* 2005, 95, 116104.
17. F. H. J. van der Heyden, D. J. Bonthuis, D. Stein, C. Meyer and C. Dekker, *Nano Lett.* 2007, 7, 1022-1025.
18. C. Nie, A. J. H. Frijns, R. Mandamparambil and J. M. J. den Toonder, *Biomed. Microdevices,* 2015, 17, 47.
19. Z. R. Xu, C. H. Zhong, Y. X. Guan, X. W. Chen, J. H. Wang and Z. L. Fang, *Lab Chip,* 2008, 8, 1658-1663.
20. N. S. Lynn and D. S. Dandy, *Lab Chip,* 2009, 9, 3422-3429.
21. D. R. Reyes, D. Iossifidis, P. A. Auroux and A. Manz, *Anal. Chem.,* 2002, 74, 2623-2636.
22. D. C. S. Bien, P. V. Rainey, S. J. N. Mitchell and H. S. J. Gamble, *Micromech. Microeng.,* 2003, 13, S34-S40.
23. S. C. Jacobson, A. W. Moore and J. M. Ramsey, *Anal. Chem.,* 1995, 67, 2059-2063.
24. C. J. Wadsworth, N. Yanagisawa and D. Dutta, *J. Power Sources,* 2010, 195, 3636-3639.
25. T. F. Kinde, T. D. Lopez and D. Dutta, *Anal. Chem.,* 2015, 87, 2702-2709.
26. T. F. Kinde and D. Dutta, *Anal. Chem.,* 2013, 85, 7167-7172.
27. R. Lucas, *Kolloid Z.,* 1918, 23, 15-22.
28. D. Yang, M. Krasowska, C. Priest, M. N. Popescu and J. Ralston, *J. Phys. Chem. C,* 2011, 115, 18761-18769.
29. D. Dutta, *Microfluid. Nanofluid.,* 2011, 10, 691-696.
30. F. H. J. van der Heyden, D. Stein and C. Dekker, *Phys. Rev. Lett.,* 2005, 95, 116104.
31. Y. B. Xie, X. W. Wang, J. M. Xue, K. Jin, L. Chen and Y. G. Wang, *Appl. Phys. Lett.,* 2008, 93, 163116.
32. A. Bentien, T. Okada and S. Kjelstrup, *J. Phys. Chem. C,* 2013, 117, 1582-1588.
33. B. S. Kilsgaard, S. Haldrup, J. Catalano and A. Bentien, *J. Power Sources,* 2014, 247, 235-242.
34. S. Haldrup, J. Catalano, M. Hinge, G. V. Jensen, J. S. Pedersen and A. Bentien, *ACS Nano,* 2016, 10, 2415-2423.

Example 2: Electrical Power Generation in Micro- and Nanoscale Channels

In this example, we present example work with electrical power generation by fluidic means in micro- and nanoscale channels. The introduction of an electrolytic liquid (e.g., water) around a non-neutral solid surface leads to a distribution of electrical charges. In this situation, electrokinetic flow in the form of electro-osmosis or electrophoresis can be observed by applying a voltage across the channel terminals. Alternatively, it is possible to generate an electrical voltage across the terminals of a micro- or nanoscale channel by simply driving a fluid through it using pressure-gradient. This phenomenon occurs as the counter ions accumulated around the channel wall are transported by the pressure-driven flow causing a convection current, referred to as a streaming current. To maintain electrical neutrality at the channel terminals, a streaming potential between the two ends of the channel automatically develops yielding a source for electrical power generation.[1]

While the fundamental physics behind this kind of energy conversion mechanism has been studied[1,2,3], its experimental demonstration, in limited contexts, has been realized only in the past decade. One of the recent works done by van der Heyden, et al.[4] showed that upon hydrodynamically flowing an low ionic strength electrolyte through a 75 nm deep conduit a maximum power of 240 pW (pico-watt) can be generated. Although the magnitude of this electrical power is small, it can be amplified by the use of multiple fluidic channels connected in parallel. For example, Olthuis, et al.[5] introduced water through a porous (1.0~1.6 μm) glass filter that served as fluidic channels and obtained 20 nW (nano-watt) of electrical power. To further amplify the power output there is also a report[6] of storing the electrical energy generated by this phenomenon in a capacitor which later is discharged rapidly to drive an electronic element having higher power needs. In this example, we investigate two other modifications to an electrokinetic battery device, referred to herein as a microfluidic electrochemical system and/or a microfluidic electrochemical cell (a microfluidic electrochemical system may include one or more microfluidic electrochemical cells), one of which has a micro-nanochannel junction and the other relies on capillary pressure to drive the electrolytic fluid.

Figure 7:
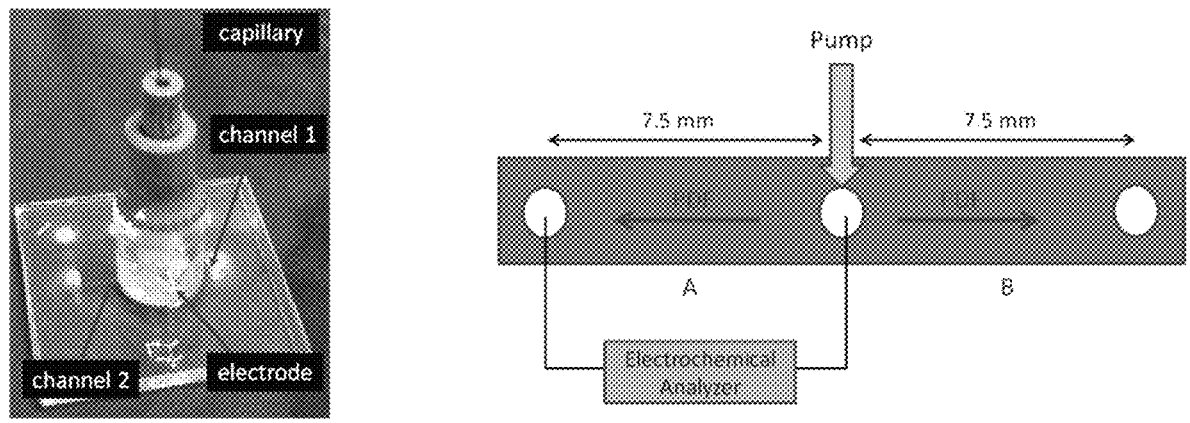
FIG. 7 is a photograph and schematic showing a microfluidic electrochemical cell utilizing a pump for comparative purposes. An electrolyte introduced from a syringe pump flows through a capillary tube and enters channel segment A & B.

Exemplary Device Fabrication & Experimental Setup: The microfluidic electrochemical system (having a microfluidic electrochemical cell) shown in FIG. 7 is fabricated using borosilicate glass substrates. This example, which utilizes a pump to drive fluid, provides a basis of comparison with capillary based systems and provides insight on the effect of ion concentration and channel depth. Three access holes are created across a microfluidic channel, and a connector between the microfluidic channel and a capillary tube is placed at the access hole in the middle. For studying the performance of the microfluidic electrochemical system, we used an electrochemical analyzer (CHI 1100A, CH Instruments, Inc.), which is connects across a channel segment A through platinum electrodes, and performs open circuit voltage and cyclic voltammetry measurements. The volumetric flow rate is controlled using a syringe pump (Fisher Scientific).

Figure 8A:
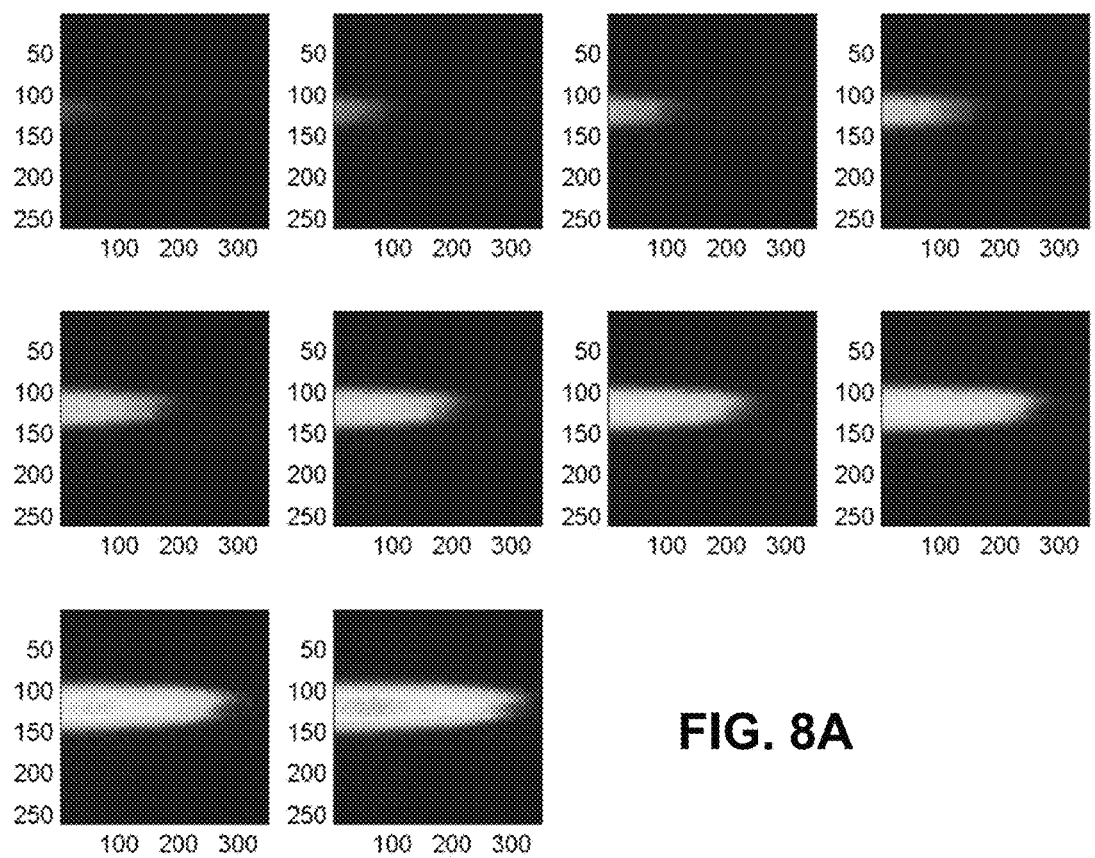
FIG. 8A is a set of snapshots of fluidic flow (rhodamine B) introduced by a syringe pump (flow rate 45 μL/hour). These images are captured every 0.183 seconds. The scale in x- and y-axis is in pixels.
Figure 8B:
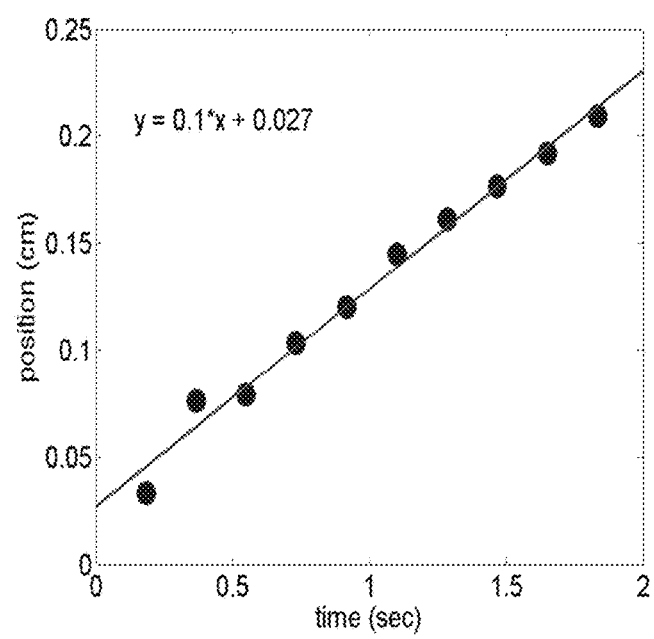
FIG. 8B is a plot of the change in the position at the forefront of the flow stream with time. The flow velocity (cm/sec) is estimated from the slope of the fitted linear regression line.

Determination of Flow Rate: There are some practical restrictions in terms of taking measurements in certain example experiments. First, the electrochemical analyzer which is used in the laboratory has a measurable range for an open circuit voltage between −10 to +10 volts. In some cases, when a fluidic channel whose depth is less than 1 μm is used, the voltage may exceed the measurable range even for the minimum flow rate (2 μL/hour) that the syringe pump is able to supply. In order to reduce the controllable flow rate further, for example, we may split the flow stream supplied from the syringe pump into two channel segments using the microfluidic electrochemical system described in FIG. 7. In such a case, a fraction of a liquid enters the cell/battery side of the microfluidic channel (segment A) and hence the flow rate through it becomes lower than that programmable by the syringe pump. However, the actual flow rate in the channel can be experimentally determined. FIG. 8A shows the snapshots of a liquid flow (rhodamine B) captured using a CCD camera every 0.183 sec. The scale shown in x- and y-axis are in pixels, and exemplary experiment reveals that 1 pixel corresponded to ~0.2 mm. From this information, the actual flow rate in the microfluidic channel can be estimated. FIG. 8B describes the change in the x-axis position measured at the forefront of the flow stream as a function of time. As can be seen from the graph, the position changes linearly with time, which indicates that the flow velocity is constant. In this situation, the flow velocity ($u_{PDF}$) can be determined simply from the slope of the graph $$\left(\frac{\text{position (cm)}}{\text{time (sec)}}\right).$$

Since we know the cross section area (A) of the channel, the volumetric flow rate (Q) is determined from $Q = A \, u_{PDF}$.

Figure 9:
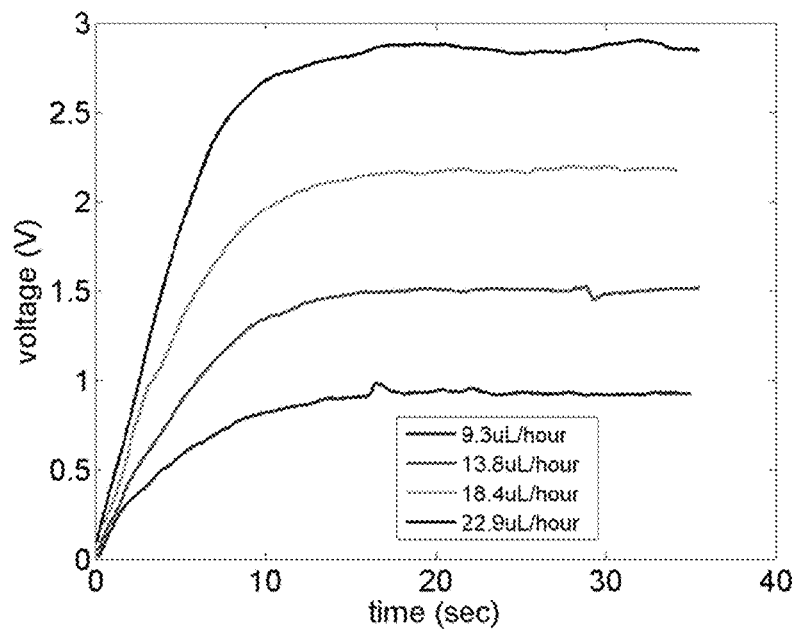
FIG. 9 is a plot of open circuit voltage measurements (scan rate 0.1 sec), for which parameters include: microfluidic channel depth 0.3 μm and $10^{-6}$ M potassium chloride solution is used as solvent.

Transient Measurements: Although the exemplary microfluidic electrochemical system described here develops a steady voltage once the streaming current is cancelled by its ionic counterpart, there is a finite time needed to reach this equilibrium. Over the period when the streaming current exceeds the ionic one, the voltage developed across the channel terminals rises from an initial value of zero. In order to see this transient variation, the open circuit voltage is measured every 0.1 sec. FIG. 9 shows a result typically observed in these measurements which is obtained by flowing $10^{-6}$ M KCl solution through a 0.3 μm deep channel depth 0.3 μm. The voltage in exemplary microfluidic electrochemical system increases during the first few seconds and then reaches a steady value, which is the streaming potential for the devi exemplary microfluidic electrochemical system.

Figure 10:
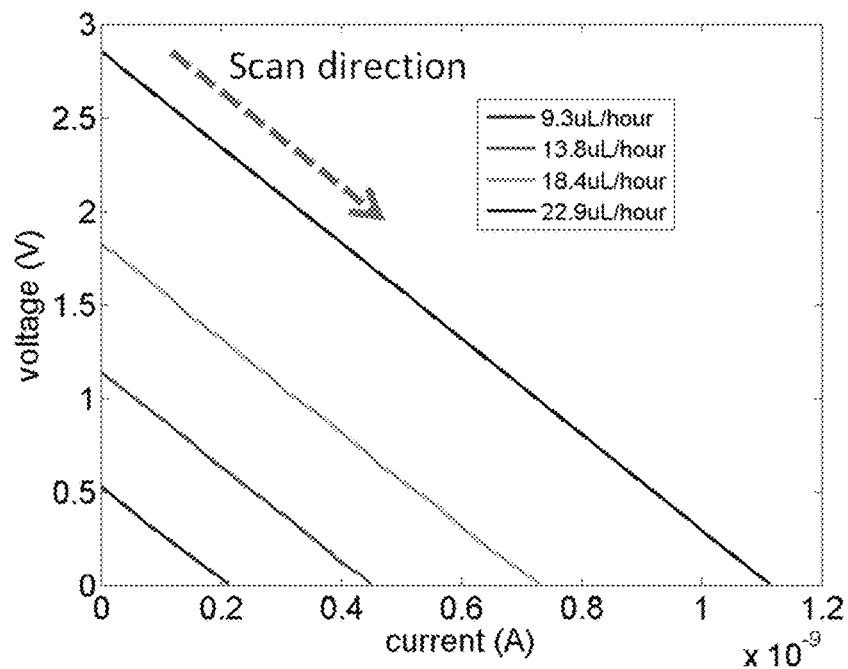
FIG. 10 is a plot of cyclic voltammetry measurements (scan rate=0.1 V/sec). The current obtained at zero voltage refers to as a streaming current, and the voltage obtained at zero current is referred to as a streaming voltage.

Notice that it is also possible to measure the transient current through the system as this voltage develops by applying a back potential using an electrochemical analyzer and monitoring the electrical current at the same time. This whole process is performed by taking a cyclic voltammetry measurement using an electrochemical analyzer. In this experiment, an external voltage applied to the battery device increases by 0.1 V every 1 sec (scan rate=0.1 V/sec). FIG. 10 shows the result of a typical cyclic voltammetric measurement (0.3 μm channel depth; $10^{-6}$ M KCl). Initially, the measured voltage starts from an open circuit voltage because no external back voltage is applied to it. As the magnitude of the back voltage increases with time, the observed voltage decreases and eventually reaches toward zero. At this point, the voltage developed in the battery device is completely cancelled out by the external voltage. The electrical current observed at zero voltage is the streaming current, which is expressed as $$I_s = \frac{A\varepsilon_0\varepsilon_r}{\eta l}\Delta P \zeta$$

For a particular electrolyte flowing through a channel of fixed dimensions, all the terms in equation (1) are held constant except ΔP. In this situation, as can be seen in FIG. 10, $I_s$ varies linearly with the flow rate, which is proportional to ΔP.

When an electric potential is developed across the channel a conduction current ($I_c$) also arise against the direction of $I_s$ which may be expressed as $$I_c = A\sigma\frac{V_o}{l} \quad (2)$$

where σ is the conductivity of the electrolyte and $V_o$ is the voltage difference across the channel. The streaming potential in the system is obtained when there is no net current in the channel, i.e., $I_s - I_c = 0$, yielding $$\frac{A\varepsilon_0\varepsilon_r}{\eta l}\Delta P \zeta = A\sigma\frac{V_o}{l} \quad (3)$$

Thus, the streaming potential ($V_s$) can be described by $$V_s = V_o = \frac{\varepsilon_0\varepsilon_r}{\sigma\eta}\Delta P \zeta \quad (4)$$

In FIG. 10, the streaming potential is obtained from the y-intercept when the net current in the channel is zero. Again, $V_s$ only depends on the flow rate when the channel dimension and ionic concentration are maintained.

Figure 11:
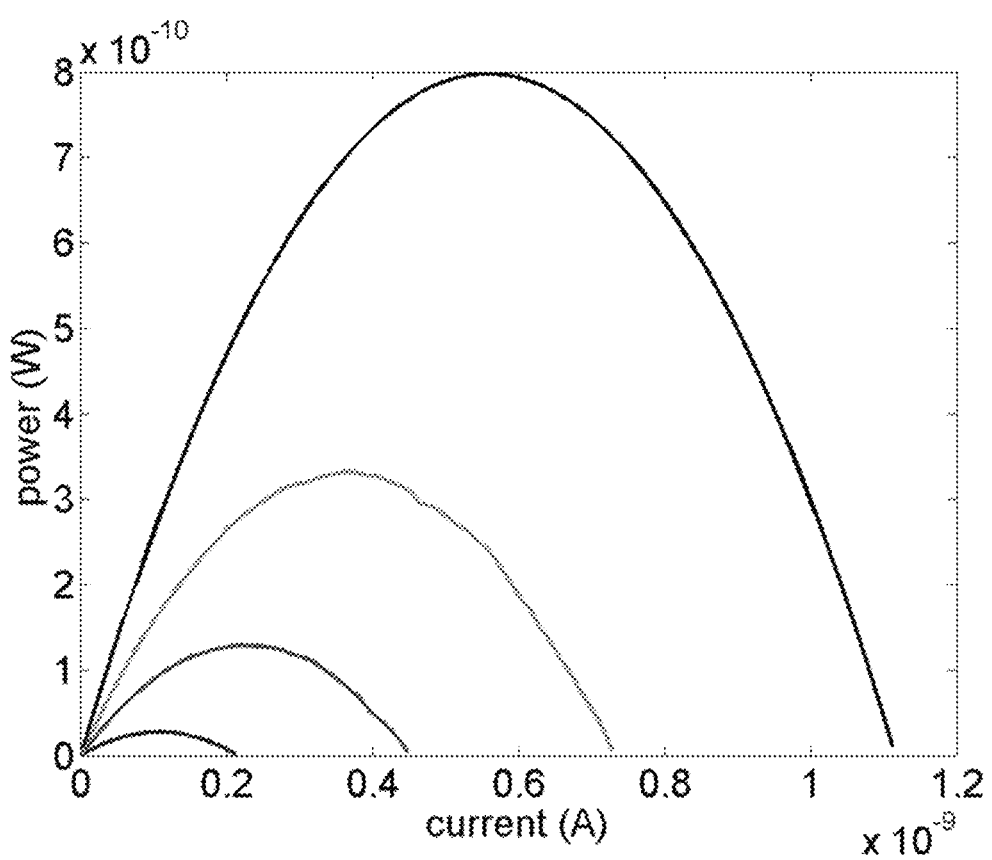
FIG. 11 is a plot of polarization curves obtained from four different volumetric flow rates. The amount of the power output (W) is calculated from the voltage and current measurements shown in FIG. 10.

FIG. 11 describes a polarization curve: electric power vs. current. The electric power (current×voltage) is directly obtained from the cyclic voltammetry measurement in FIG. 10. As can be seen from the graph, the power cannot be extracted from the battery when the voltage reaches to a streaming potential (=zero current), or the current reaches to a streaming current (=zero voltage). Theoretically, it is known that the maximum power output ($P_{max}$) that can be extracted from the battery source is $P_{max} = \frac{1}{4}V_s I_s$. This is discussed more in detail in the Results and Discussion section.

Exemplary processes: In this section, we have experimentally characterize exemplary microfluidic electrochemical system (with exemplary microfluidic electrochemical cell (s)) under four different exemplary situations. Firstly we use different concentrations of potassium chloride ($10^{-4}$, $10^{-5}$, $10^{-6}$ M) solutions and investigate a power transfer efficiency (power output/power input) for a fixed channel depth and flow rate. Secondly, we study the power efficiency of exemplary system using different channel depths (30, 10, 3, 1, and 0.3 μm) for a fixed pressure drop and ionic concentration. Thirdly we perform experiments with microfluidic ducts that had micro-nanochannel junctions in them. In this case, instead of using a uniformly etched channel, we teste fluidic channels that have a shallow segment in it. Fourthly, we describe the possibility of generating electric power without a direct power input. More specifically, we utilize the capillary force within a channel for dragging the electrolyte through it. By using an open channel design, continuous fluid flow is observed and hence electric power is generated.

Figure 12A:
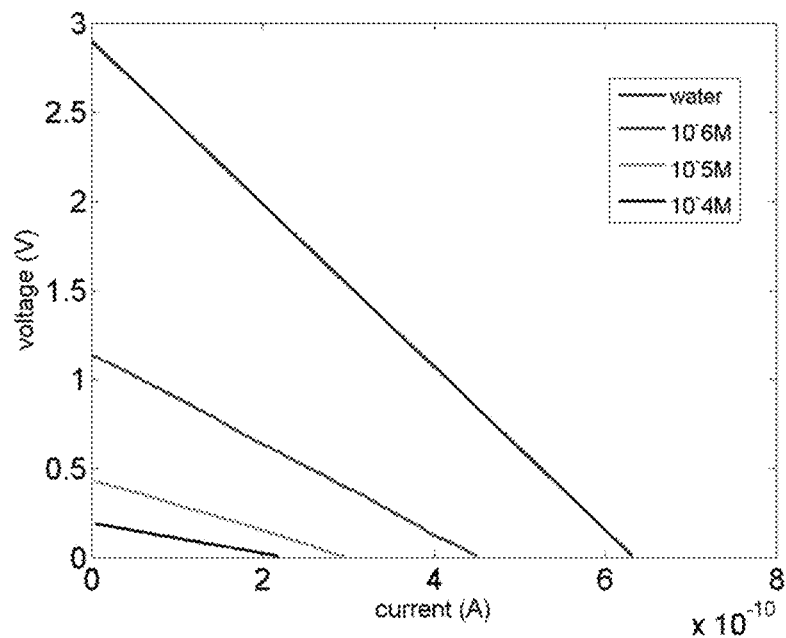
FIG. 12A is a plot of cyclic voltammetry measurements using 3 μm microfluidic channel depth with 13.8 μL/hour volumetric flow rate.
Figure 12B:
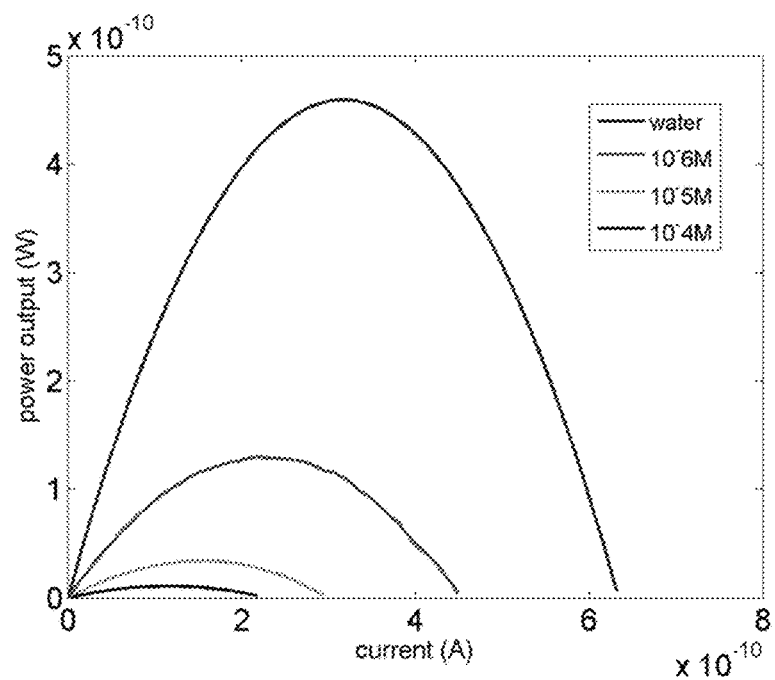
FIG. 12B is a plot of polarization curves prepared directly from the result of the graph in FIG. 12A.

Exemplary results: Effect of ionic concentration: To study the effect of the ionic strength on the power output, potassium chloride (KCl) solution ($10^{-4}$, $10^{-5}$, $10^{-6}$ M) and deionized water are tested as a fluidic media. FIG. 12A shows cyclic voltammetric measurements obtained using a 3 µm deep microfluidic channel with 13.8 µL/hour volumetric flow rate. The electrical power extracted from exemplary microfluidic electrochemical system (with exemplary microfluidic electrochemical cell(s)) depends on the magnitude of a streaming current $$\left(I_s = \frac{A\varepsilon_0\varepsilon_r}{\eta l}\Delta P\zeta\right)$$

and a streaming voltage $$\left(V_s = \frac{\varepsilon_0\varepsilon_r}{\sigma\eta}\Delta P\zeta\right),$$

which are obtained from x-intercept and y-intercept of the graph in FIG. 12A, respectively. $I_s$ and $V_s$ are both directly related to $\zeta$, which is reduced by increasing the ionic strength. As can be seen from the graph, this theoretical prediction is is matched with exemplary experimental results. FIG. 12B is a polarization curve that is prepared directly from the result of the cyclic voltammetry measurements in the graph in FIG. 12A. Because the power is obtained from the multiplication of current and voltage, its magnitude is directly related to square of the zeta potential ($\zeta^2$) for a fixed pressure drop ($\Delta P$) across a channel of a particular geometry. The power output shown in the graph in FIG. 12B increases with the use of lower ionic strength, and this can be explained based on this strong dependence on the zeta potential.

The maximum energy conversion efficiency ($E_{ff}$) for exemplary microfluidic electrochemical system can be obtained from the ratio of total power input and maximum power output ($P_{max}$) at the load.

$$E_{ff} = \frac{\text{power output}}{\text{power input}} = \frac{P_{out}}{\Delta PQ} \quad (5)$$

In our case, the power input is the mechanical work done by a syringe pump, which can be evaluated as $\Delta PQ$, where $\Delta P$ and Q are the pressure drop and volumetric flow rate, respectively. The maximum power output ($P_{out}$) is obtained from the polarization curves in FIG. 12B. The applied pressure ($\Delta P$) can be estimated by the expression of pressure-driven flow velocity ($u_{PDF}$).

$$\Delta P = \frac{12\eta L}{d^2}u_{PDF} \quad (6)$$

In SI units, both power input and output are expressed as $$\frac{\text{kg}\cdot\text{m}^2}{\text{sec}^3}$$

Figure 13A:
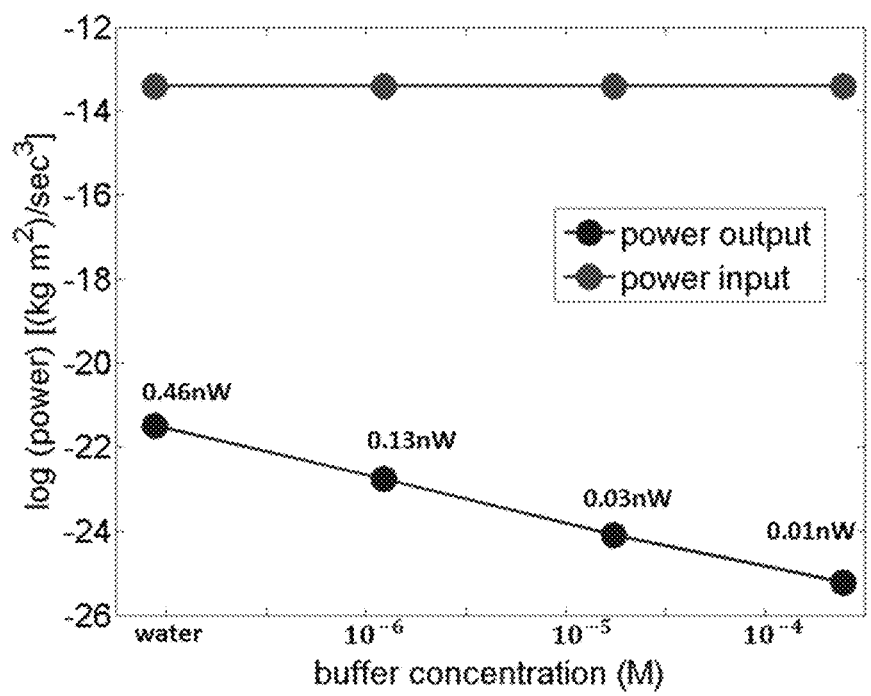
FIG. 13A is a plot of power input by mechanical work and power output by electrical work versus buffer concentration.
Figure 13B:
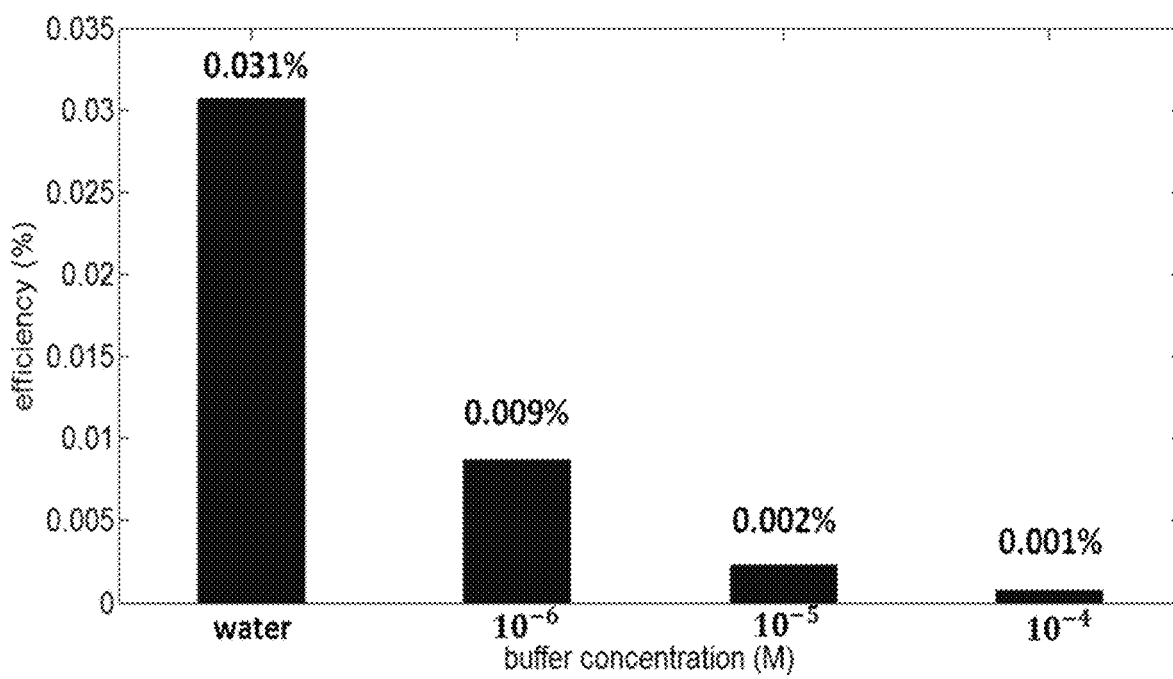
FIG. 13B is a graph of power transfer efficiency (%) obtained from the ratio of power input and output in the graph in FIG. 13A.

We compare the magnitude of the power input and output in FIG. 13A and their efficiency in FIG. 13B. For a fixed channel dimension and volumetric flow rate, the amount of power input is unchanged in an exemplary microfluidic electrochemical system. In this particular condition, the amount of power output decreases with the use of higher ionic strength electrolytes. The high efficiency of 0.031% is found by using deionized water as the fluid medium.

Figure 14A:
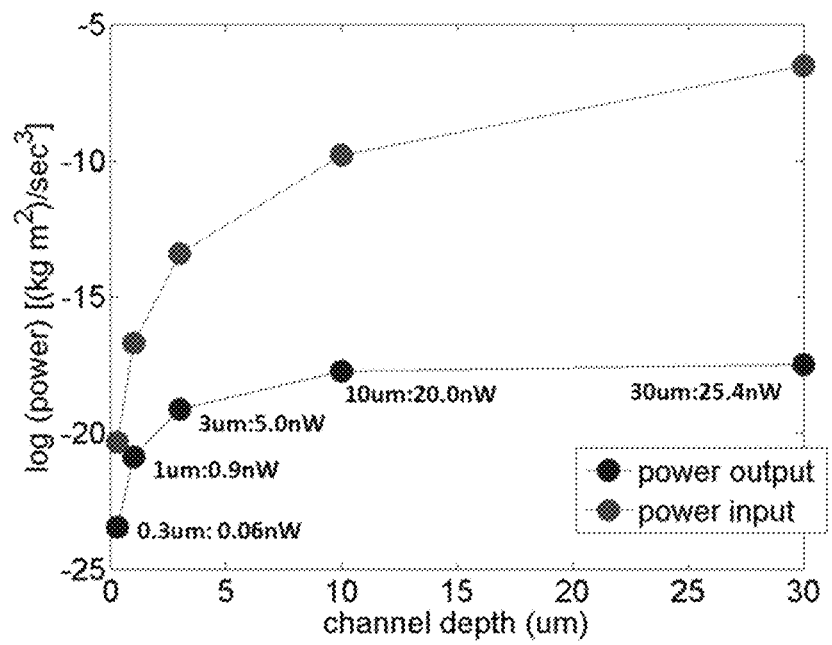
FIG. 14A is a plot of power input by mechanical work and power output by electrical work versus microfluidic channel depth.
Figure 14B:
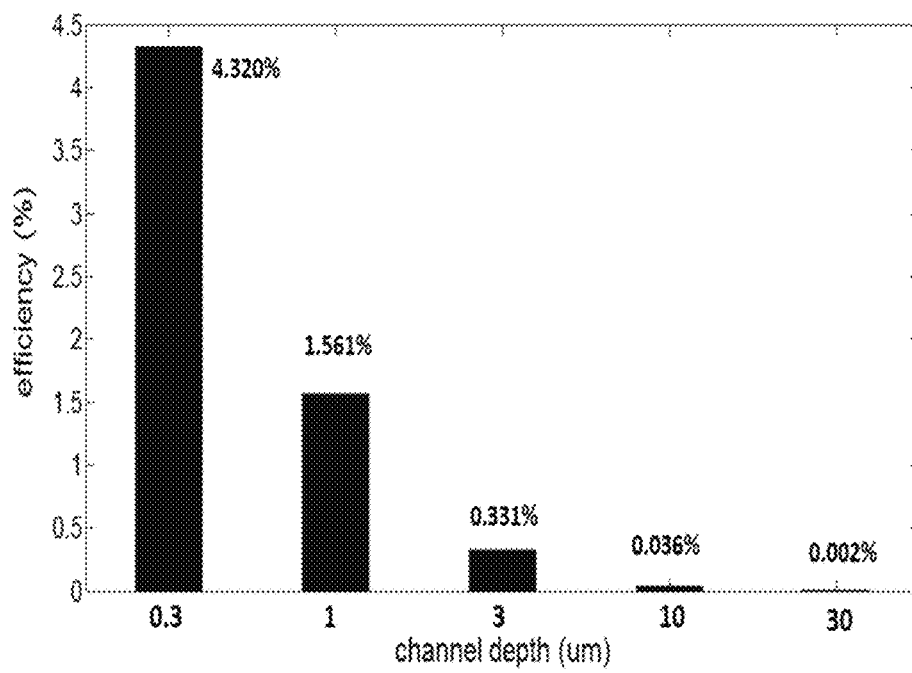
FIG. 14B is a graph of power transfer efficiency (%) obtained from the ratio of power input and output in the graph in FIG. 14A.

Effect of channel depth: To study the effect of channel depth on the system performance, we prepare five different channel depths (30, 10, 3, 1, and 0.3 µm). The maximum power output is determined from cyclic voltammetry measurements using deionized water as the fluid solution and under an assumed condition where the applied pressure ($\Delta P$) is 1 bar ($=1.0\times10^5$ Pa). FIGS. 14A-14B show the result of the power input and output (graph FIG. 14A) and efficiency (graph FIG. 14B). Because $\Delta P$ is maintained for all the channel depths, the pressure-driven flow velocity is lowered by using shallower channel (equation (6)). Hence, the amount of power input also goes down by the use of shallower channel depth in this condition. The smaller power output for shallower channel depth can be also explained by the reduction in the volumetric flow rate due to smaller $\Delta P$. As shown in FIG. 14B, however, the power efficiency is significantly higher when shallower channel depth is used. Since the origin of the electrical power generation in this type of system is the transport of mobile counter ions accumulated around the charged channel wall, it has been reported that energy conversion efficiency may be expected to be the highest in the regime of double layer overlap[7]. With the use of 0.3 µm channel depth, an efficiency of 4.32% is obtained by flowing deionized water under $\Delta P=1$ bar.

Figure 15:
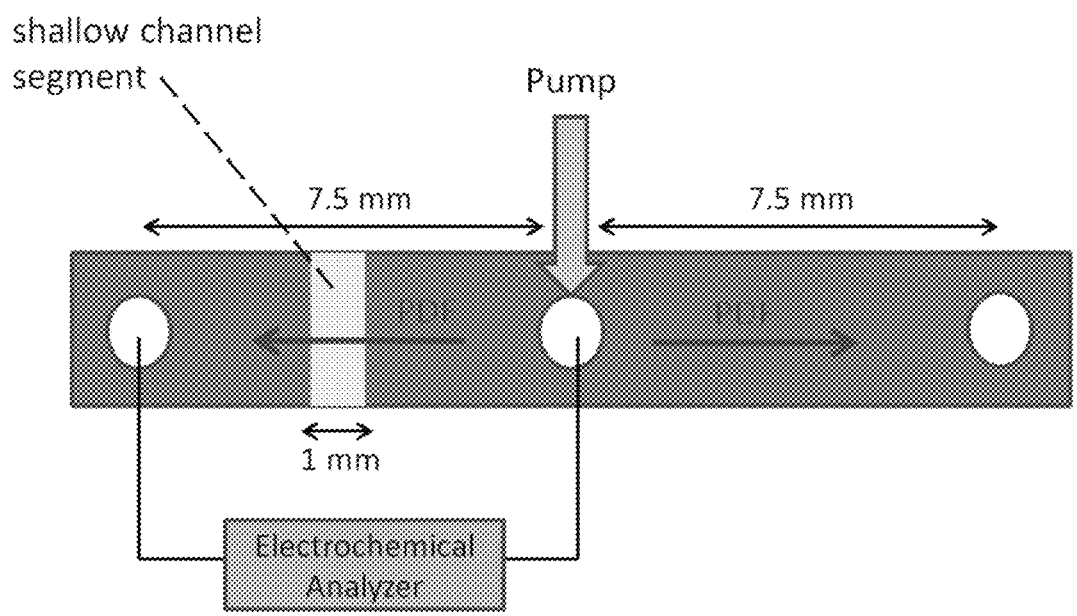
FIG. 15 is a schematic of a microfluidic electrochemical cell with a pump for comparative purposes. A shallow microfluidic channel segment (~1 mm) is prepared in the middle of the channel.

Effect of the Shallow region: One of the ways to increase the amount of power output is to reduce the channel resistance. For this purpose, we modify the channel geometry by creating a shallow segment (~1 mm length) in the middle of the channel (FIG. 15). The shallow segment in this system serves for generating larger electric power while the deeper channel segments at both sides are for reducing the total system (battery) resistance.

Figure 16:
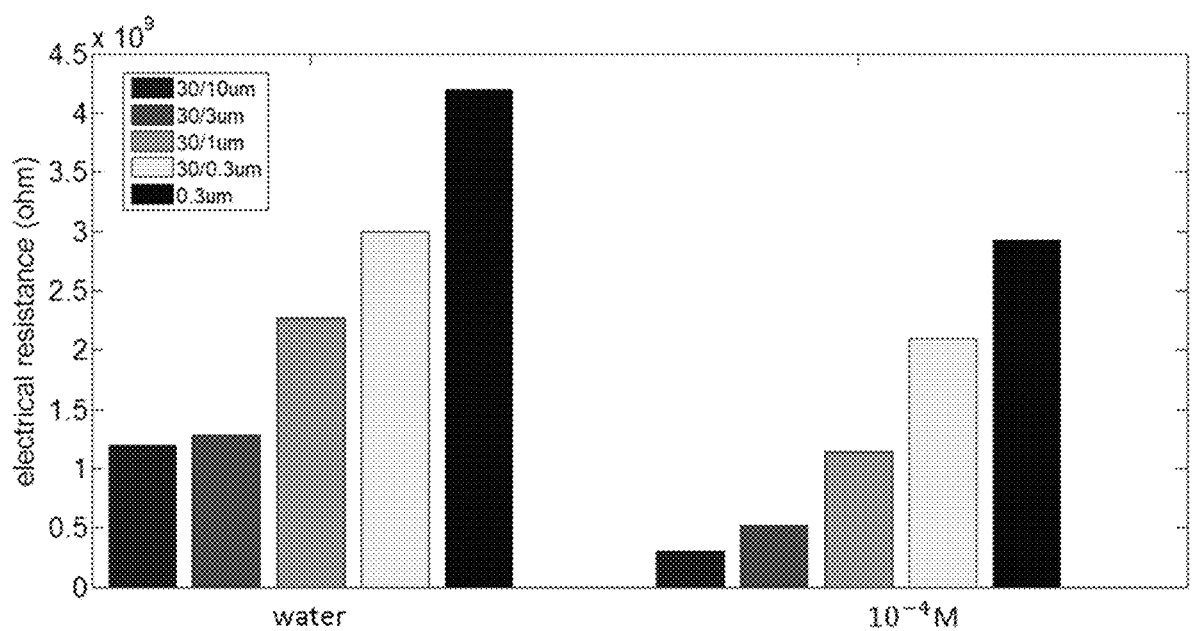
FIG. 16 is a graph of electrical resistance obtained using different shallow microfluidic channel segments (10, 3, 1, and 0.3 µm) with a fixed deep channel segment (30 µm). The black bar is the resistance of a uniform channel depth (0.3 µm). Solution is KCl.

We test 10 channel patterns with the different combinations of deep segments (30, 10, 3, and 1 µm) and shallow segments (10, 3, 1, and 0.3 µm). As an example, FIG. 16 summarizes the electrical resistance obtained using a 10, 3, 1, and 0.3 µm shallow channel segment with a fixed depth of 30 µm deep segment. Compared to the channel with a uniform depth (0.3 µm), which is presented in black bar in the figure, the resistance is observed to be lower by increasing the depth of the deep channel segment. With the use of KCl solution ($10^{-4}$ M) as the solvent, the resistance is reduced further for all the channel patterns due to the increase in conductance of the solution.

In Table 1, we summarize the power conversion efficiency ($E_{ff}$) of all the channel patterns using deionized water under $\Delta P=1$ bar. The highlighted values are obtained from uniform channel depths. Although there are some deviations in the trend, in general, the efficiency is improved by using shallower channel heights for a fixed depth for the deep or shallow channel segments. As discussed earlier, the reduction of battery resistance is realized by modifying the channel geometry; however, exemplary result shows that the power efficiency may be compromised instead, for example. Table 1.

Power conversion efficiency (%) using deionized water under $\Delta P=1$ bar. The bold and outlined values are obtained from uniform channel depths.

| deep segment (μm) | shallow segment (μm) | | | | |
|---|---|---|---|---|---|
| | 30 | 10 | 3 | 1 | 0.3 |
| 30 | 0.002 | 0.009 | 0.073 | 0.347 | 2.267 |
| 10 | | 0.036 | 0.055 | 0.215 | 2.185 |
| 3 | | | 0.331 | 0.389 | 2.772 |
| 1 | | | | 1.561 | 3.069 |
| 0.3 | | | | | 4.320 |

Figure 17:
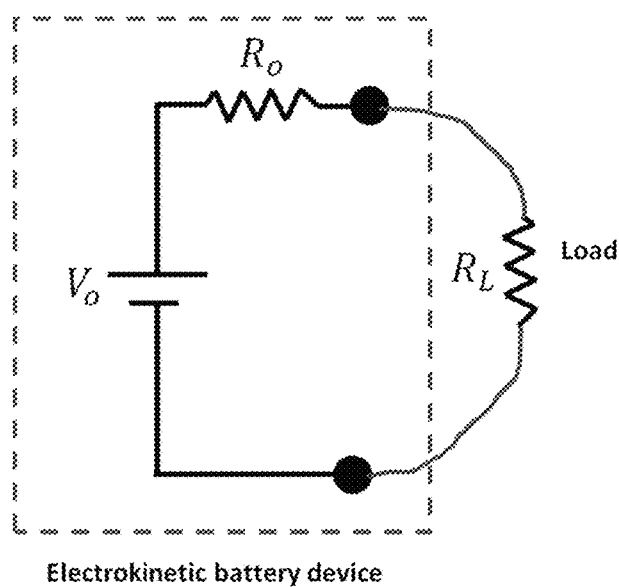
FIG. 17 is a schematic diagram of an electric circuit of the exemplary microfluidic electrochemical cell. $R_o$ and $R_L$ are the channel and load resistances, respectively. $V_o$ is the voltage difference generated in the exemplary microfluidic electrochemical cell.

The ability to control the system (battery) resistance is an important factor for designing an electric circuit that maximizes the power delivery to a load. FIG. 17 shows an electric circuit of the exemplary microfluidic electrochemical system (with exemplary microfluidic electrochemical cell(s)) that is connected to an external load. There is an optimum load resistance ($R_L$) that permits maximum power delivery to the particular component.

Because electric power is defined as P=IV, using Ohm's law, this can be rewritten as $$P = I(R_L I) \quad (7)$$

$$P = \left(\frac{V_o}{R_{total}}\right)^2 R_L \quad (8)$$

$$P = \left(\frac{V_o}{R_0 + R_L}\right)^2 R_L \quad (9)$$

The value of $R_L$ that maximizes power can be determined by setting the derivative of P with respect to $R_L$ is zero.

$$\frac{dP}{dR_L} = 0 \quad (10)$$

$$\frac{dP}{dR_L} = \left(\frac{(R_o + R_L)^2 - 2R_L(R_o + R_L)}{(R_o + R_L)^4}\right) = 0 \quad (11)$$

$$(R_o + R_L)^2 = 2R_L(R_o + R_L) \quad (12)$$

$$R_L = R_o \quad (13)$$

Therefore, power output is maximized when the magnitude of a load resistance equals to battery resistance. The maximum power ($P_{max}$) can be obtained by substituting $R_L = R_o$, in equation (3):

$$P_{max} = \left(\frac{V_o}{R_L + R_L}\right)^2 R_L \quad (14)$$

$$P_{max} = \frac{1}{4} V_o I \quad (15)$$

As discussed herein, the exemplary microfluidic electrochemical system resistance varies with the channel depth. Although larger power can be obtained by the use of a shallower channel depth, its resistance goes up to ~4.3 giga-ohms for 0.3 μm depth with deionized water in it. This may be non-ideal for certain contexts, for example, when considering that the load resistance also needs to be as high as a few giga-ohms to maximize the power output at the load. Designing a channel geometry that reduces the system (battery) resistance without compromising the power efficiency is considered.

Figure 18:
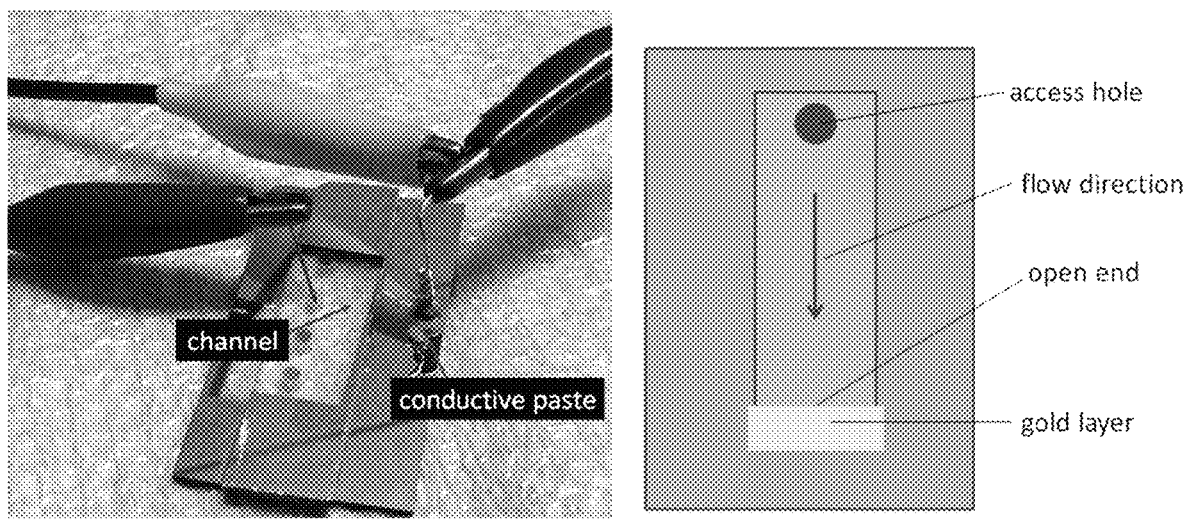
FIG. 18 is a photograph and schematic showing an opened channel an exemplary microfluidic electrochemical cell. A layer of gold, which serves as an electrode, is deposited to the bottom substrate. A conductive paste is used to ensure the contact between the gold surface and metal wire.

Electric power generation by the use of a capillary force: Thus far in this example, we characterized exemplary system (battery) performance by controlling the volumetric flow rate using a syringe pump. Interestingly, it is also possible to do the same using capillary forces in micro- and nanoscale channels. Such an exemplary microfluidic electrochemical system (with exemplary microfluidic electrochemical cell(s)) is presented in FIG. 18. This system/cell is operated by simply placing a drop of an electrolyte in the access hole. The channel is eventually filled with the liquid due to a capillary force. Since the end of a channel is open, the liquid exposed to the air evaporates continuously. In this situation, the empty space created due to liquid evaporation is instantly filled by more liquid from the reservoir yielding a continuous fluid flow in the channel.

Figure 19:
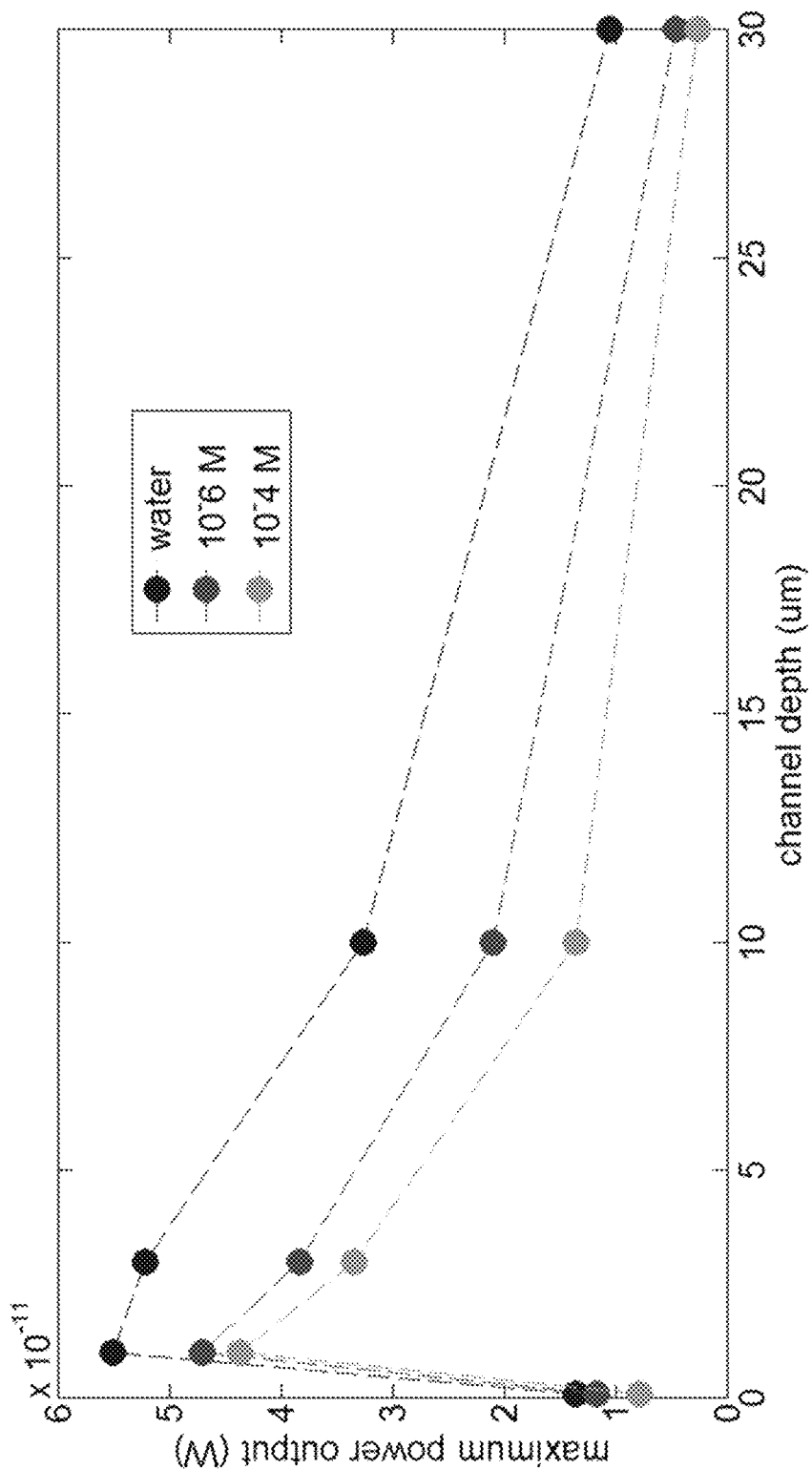
FIG. 19 is a plot of maximum power output using different microfluidic channel depths (0.1, 1, 3, 10, and 30 µm). Deionized water and KCl solution ($10^{-6}$ and $10^{-4}$ M) are tested as solvents.

By employing this idea, we study the effect of the channel depth (0.1, 1, 3, 10, and 30 μm) on the amount of power output (FIG. 19). Higher power output is obtained using an electrolyte of lower ionic strength for all the channel depths. Also, an increase in the maximum power output is observed by reducing the channel depth (up to 1 μm). An example reason for a sudden decrease in power output by the use of 0.1 μm channel depth, in an example scenario, is that the end of the channel may be partially blocked by the gold layer preventing liquid evaporation. No active power input is necessary for this exemplary system. Increasing the scale of the power output is considered.

In this example, we have demonstrate an electrical power generation by externally introducing an electrolyte into an exemplary microfluidic electrochemical system (with exemplary microfluidic electrochemical cell(s)). Both streaming current and voltage are inversely related to the ionic strength of the solution. Also, a higher efficiency is obtained using shallower channel depth since more counter ions are transported by pressure-driven flow. With the use of 0.3 μm channel depth, the high efficiency of 4.32% is obtained by flowing deionized water at $\Delta P=1$ bar. A modified channel geometry with a shallow is also tested, and a reduction of the system resistance is clearly observed. We also demonstrate electrical power generation without any active mechanical power input. The system efficiency is infinitely large therefore. By employing this idea for the system that has multiple channels (e.g., porous material), it is possible to generate a considerable amount of power that may be attractive for industry, for example.

REFERENCES

1 Morrison, F. A.; Osterle, J. F. *J. CHem. Phys.* 1965, 43, 2111.
2 Yang, J.; Lu, F.; Kostiuk, L. W.; Kwok, D. Y. *J. Micromech. Microeng.* 2003, 13, 963-970.
3 Chun, M.-S.; Lee, T. S.; Choi, N. W. *J. Micromech. Microeng.* 2005, 15, 710-719.
4 van der Heyden, F. H. J.; Bonthuis, D. J.; Stein, D.; Meyer, C.; Dekker, C. *Nano Lett,.* 2007, 7, 1022-5.
5 Olthuis, W.; Schippers, B.; Eijkel, J.; van den Berg, A. *Sensor Actuat B-Chem.* 2005, 111-112, 385-389.
6 Yang, J.; Lu, F.; Kostiuk, L. W.; Kwok, D. Y. *J. Nanosci. Nanotechnol.* 2005, 6, 648-652.

7 van der Heyden, F. H. J.; Bonthuis, D. J.; Stein, D.; Meyer, C.; Dekker, C. Nano Lett. 2007, 7, 1022-1025.

Example 3: Electrical Energy Generation in Fluidic Channels and Membranes Using Spontaneous Capillary Flow With the emergence of fluidic instrumentation, technologies enabling the precise transport of liquid samples through micro- and nanometer scaled structures have received significant attention from the research community. Such flows driven by electric/magnetic fields, acoustic waves, temperature gradients and surface tension among other forces have led to the development of several novel approaches to molecular separation, analyte sensing, material synthesis and energy generation methods that keep pushing scientific boundaries. One such effort focuses on the development of fluidic batteries which run by transporting electrolyte solutions around electrically charged surfaces using a pressure-drive. Electrolyte flow through a channel with a net surface charge produces an electrical current (streaming current) due to migration of the counter-ions in the Debye layer. This phenomenon causes a charge separation that leads to a voltage difference across the channel terminals driving an ionic current opposing its streaming counterpart. At equilibrium, the streaming potential developed across the ends of the conduit produces just enough ionic current to completely nullify the charge transport through the system. The end result is a fluidic battery that converts the mechanical energy of the flowing electrolyte into electrical energy capable of powering an external device. Interestingly, exemplary fluidic batteries disclosed herein, referred to herein as microfluidic electrochemical systems or exemplary microfluidic electrochemical cells (wherein the system includes one or more cells), to electrical energy generation, in some examples and embodiments, may operate without the use of expensive chemicals, electro-catalysts or membranes, the use of which may be optional, and yields high energy-conversion efficiencies upon employing deionized water as the electrolyte medium, which is both environment-friendly and available in abundance. Nevertheless, the use of external means such as a mechanical pump or a pressurized vessel to drive the needed electrolyte flow compromises the practical use of conventional fluidic batteries. Besides limiting the miniaturization and portability of fluidic batteries, such a requirement introduces additional electrical power losses at the interface between the pump/pressurized vessel and the micro-/nanofluidic duct deteriorating the overall energy-conversion efficiency of the system.

Presently disclosed microfluidic electrochemical systems (having one or more microfluidic electrochemical cells) address this major limitation of conventional micro-/nanofluidic battery systems by eliminating the need for an external pump or pressurized vessel to drive the liquid flow within their channel structures. Instead, the microfluidic electrochemical systems disclosed herein use spontaneous capillary flow[15-18] for migrating the counter-ions in the Debye layer leading to the needed electrical energy generation. The noted liquid flow is sustained in the presently disclosed microfluidic electrochemical systems (having one or more microfluidic electrochemical cells) through continuous evaporation of the solvent (water) at one of the channel terminals producing a steady pressure-gradient in the systems. Exemplary microfluidic electrochemical systems (having one or more exemplary microfluidic electrochemical cells) based on this principle is demonstrated in this example, which produces a voltage of about 0.65 V and an electrical power output of 127 pW, for example, by flowing aqueous electrolytes through an individual 1 μm deep glass channel (see FIGS. 20A-20C). It wisas also observed that such electrical energy generation is boosted in exemplary microfluidic electrochemical systems upon use of deionized water as the electrolyte medium. Notably, certain exemplary microfluidic electrochemical systems allow the spontaneous generation of electricity based on the streaming potential phenomenon without any direct input of energy into the system, and do so in a sustainable way under ambient conditions. Building on these exemplary results, we describe development of exemplary microfluidic electrochemical systems that generate electrical power by driving electrolytic fluids through fluidic channels and membranes using spontaneous capillary flow.

Detailed characterization of spontaneous capillary flow and electrical energy generation in an individual bare as well as surface modified glass channel under different operating conditions: In order to maximize the electrical energy generated by disclosed microfluidic electrochemical systems, it is essential to develop a comprehensive understanding of the spontaneous capillary flow in the exemplary system and its dependence on the various operating parameters. To this end, we detail experimental characterization of this flow process in individual glass channels. Of particular interest is to establish a quantitative relationship between the measured flow velocity and the shape the liquid meniscus at the channel terminals which in turn can be controlled by modifying the geometry and nature of the solid surface where solvent evaporation occurs. Computational models are developed concurrently using MATLAB and COMSOL packages to simulate experimental results. To comprehend the effects of the liquid evaporation rate from the reservoirs on the magnitude of the spontaneous capillary flow, experiments (backed by simulations) are performed under different ambient temperatures, relative humidities and air flow conditions around the evaporating interface. Streaming potential/current measurements are carried out alongside the flow study to characterize the charge transport in the system. Operating conditions that maximize the conversion of the electrolyte flow energy into electrical power are utilized to arrive at the design rules for present microfluidic electrochemical systems. Also, glass channels coated with sulfonate groups may realize a greater surface charge density, in certain embodiments. The Gouy-Chapman theory predicts that for a given electrolyte flow velocity, such increase in the surface charge density may improve the streaming potential as well as the energy conversion efficiency of the systems. The application of polyelectrolyte coatings around the channel terminals may further increase the rate of evaporation of water in these regions. In particular, for example, the effect of coating the downstream reservoir with polydiallyldimethylammonium chloride may increase water evaporation rate by nearly a factor of two, for example, upon deposition on a silicon surface.

Realization of enhanced energy conversion efficiencies by filling the glass channel in an exemplary microfluidic electrochemical system with highly charged membranes. It is estimated that the certain exemplary microfluidic electrochemical systems convert <2% of the energy carried by the flowing electrolyte into electrical power. The energy conversion efficiency may be increased in presently disclosed microfluidic electrochemical systems to values up to, equal to, and/or greater than, 46% by flowing the electrolyte through highly charged sulfonated membranes. In any of the microfluidic electrochemical systems described herein, microfluidic channels (e.g., glass) may be filled with, for example, Nafion and/or a sulfonated polystyrene membrane, to increase the electrical power output.

Scale up of electrical power generated by exemplary microfluidic electrochemical system employing an array of open/membrane filled glass channels: An exemplary microfluidic electrochemical system such as depicted in FIGS. 20A-20C may have an electrical power output of about 127 pW. Other exemplary microfluidic electrochemical systems may have higher electrical power outputs (e.g., via array(s)s of channels and/or use of membrane(s)). For example, scaling up the electrical power generated of present microfluidic electrochemical systems may be achieved by employing an array of microfluidic channels (e.g., formed of glass) instead of an individual microfluidic channel. Such an approach can increase the electrical current that is generated by exemplary systems without compromising on the energy conversion efficiency to a significant extent. In addition, this scale-up approach enables tuning the electrical resistance of present microfluidic electrochemical systems in order to match it to that of the external device (i.e., the load; e.g., a mobile device) for increased power transfer. Besides developing the exemplary microfluidic electrochemical systems on planar glass plates, the electrical current systems may be scaled up by using a sheet of Nafion/sulfonated polystyrene membrane(s), for example. These example membranes sheet may have a great packing density of flow paths for the electrolyte medium. Other membranes, formed of other materials, may also be used. Additionally, the ability of exemplary microfluidic electrochemical systems to charge an external capacitor is disclosed. Simple electrical circuit models are developed to quantitatively understand experimental measurements as well as estimate the effective resistance and capacitance of exemplary microfluidic electrochemical systems under different operating conditions.

The present microfluidic electrochemical systems (and cells) are transformative because they present a simple and powerful approach to generating electrical power spontaneously under ambient conditions. While conventional fluidic batteries based on the concept of streaming potential and driven using external pumps and/or pressurized vessels have been previously explored in the literature[12,19], there has been no report of actuating these devices with spontaneous capillary flow as described herein. Interestingly, the present microfluidic electrochemical systems accomplish this spontaneity in operation without compromising any inherent advantages of fluidic power sources such as non-reliance on the use of expensive chemicals or electro-catalysts, according to some embodiments. Moreover, certain exemplary microfluidic electrochemical systems yield best performance upon employing deionized water as the electrolyte medium, which is both environment-friendly and available in abundance. The present examples describe exemplary design rules for exemplary microfluidic electrochemical systems, and explore approaches to enhancing spontaneous liquid flow through appropriate design of the channel terminals as well as use of polyelectrolyte coatings around them. New computational models are developed to better understand experimental data providing the community with a comprehensive set of analytical tools for further advancing the exemplary fluidic batteries. In order to improve charge transport through these systems, highly charged membranes may be used, in certain exemplary microfluidic electrochemical systems. Such membranes, for example, made from sulfonated polystyrenes, may yield energy-conversion efficiencies over an order of magnitude greater than those realized in open glass channels. Exemplary microfluidic electrochemical systems may be scaled by employing an array, or arrays, of channels within them to enhance the electrical power output. In certain exemplary microfluidic electrochemical systems, water may be used as the solvent/electrolyte medium, and optionally under ambient conditions.

Exemplary processes and results: FIGS. 20A-20C show exemplary microfluidic electrochemical systems. Exemplary microfluidic electrochemical systems (having exemplary microfluidic electrochemical cell(s)) may comprise 4 individual channels which are uniformly wide (500 μm) and deep (0.5-3 μm) with a length of 1 cm. Standard photolithographic methods are used to pattern these conduits onto a borosilicate glass plate that are later etched to the chosen depth using a buffered oxide etchant solution. The channels are sealed off in exemplary system by first bringing a glass cover plate in contact with the base plate in deionized water and then allowing the two to bond at 550° C. for 12 hrs in a furnace. While one end of these sealed conduits (microfluidic channels) is accessed by punching a 1 mm diameter hole on the cover plate using a microabrasive blasting system (Vaniman Manufacturing Co.) prior to the bonding process, the other end terminates beyond the edge of the cover plate and is therefore open to ambience (see FIG. 20B), for example. The channels and a small region around them are then covered up in the bonded system with an insulating tape leaving the open end of the conduits exposed. This system is later placed in a dual metal evaporator system (Energy Beam Sciences, Inc.) to sequentially deposit a 130 nm layer of chromium followed by a 40 nm layer of gold. The insulating tape is subsequently peeled off yielding the system shown in FIG. 20C. The noted metal layer allows electrical contact with the liquid interface where solvent evaporation occurred. The channels in certain exemplary microfluidic electrochemical systems are prepared for an experiment by dipping their open edges in methanol and then filling them up with the solvent through application of a mild vacuum at the access holes. The conduits are later rinsed with 0.1 M NaOH, deionized water and the relevant electrolyte in that order for 15 min each using the same procedure. The region around the open channel edge is finally dried with a tissue paper and the access hole is filled with a drop of the electrolyte before initiating an actual experiment. Streaming potential/current measurements across the glass channel are enabled by electrically connecting the working electrode terminal of an electrochemical analyzer (CH Instruments Inc.) to the electrolyte in the access hole using a platinum wire. The reference and the counter electrode terminals of this analyzer on the other hand, ay be shorted and connected to the open edge of the channel using an electrically conducting paste (Chemtronics, catalog #CW7100) placed on the gold layer as shown in FIGS. 20B-20C.

The fluid flow needed to produce the streaming potential/current in the exemplary microfluidic electrochemical systems relies on a spontaneous capillary flow sustained through continuous evaporation of water at the open channel edge. To demonstrate this, we perform several exemplary experiments in which the neutral tracer, Rhodamine B, is added at a concentration of 10 μM to the drop of deionized water placed within the access hole. The transport of the leading edge of this dye solution is then carefully followed to estimate the liquid flow velocity in the channel. It is pointed out that this flow is monitored in a channel which had been previously filled with dye-free deionized water distinguishing the noted transport process from that observed in the capillary filling of empty micro-/nanoducts. In FIG. 3A, the dependence of this transport rate (u) on channel depth (d) is further assessed for deionized water and a 0.1 mM aqueous solution of potassium chloride (KCl). The figure shows that the quantity u goes through a relatively sharp maximum at d=1 µm for both the chosen fluids. However, the volumetric flow rate corresponding to these velocity measurements is seen to rise monotonically with an increase in d leveling off to a value of about $4\times10^{-4}$ µL/s for conduits deeper than 2 µm. The noted trends suggest that for deeper conduits the liquid meniscus may be approaching the edge of the open channel end. In this situation, the leveling of the volumetric flow rate with d may be a result of this quantity equaling the maximum evaporation rate attainable at the open channel edge under the exemplary experimental conditions. However, for channel depths below 1 µm it appears that the liquid meniscus may somewhat retreat inside the conduit which in turn reduces the rate of evaporation dropping the liquid flow velocity in the system. The distance to which the liquid meniscus retreats in this situation may be such that the evaporation rate in the system matches the liquid flow rate induced by the capillary pressure. The pressure-drop across the channel under these conditions may plateau for small channel depths as is observed in exemplary experiments. In FIG. 3B, this pressure-drop evaluated as $\Delta P = 12\ \eta Lu/d^2$ is plotted against the parameter d and is seen to level off for channel depths below 1 µm. The pressure-drops noted in FIG. 3B are calculated based on the exemplary experimental measurements of u assuming a channel length L=1 cm and liquid viscosity $\eta=1$ cP. Leveling of the pressure-drop with d may be expected only in situations when the distance retreated by the liquid meniscus is small compared to the channel length. Experiments reported in this section are performed at an ambient temperature and relative humidity of $25\pm1°$ C. and 27.1±3.0%, respectively.

Figure 21A:
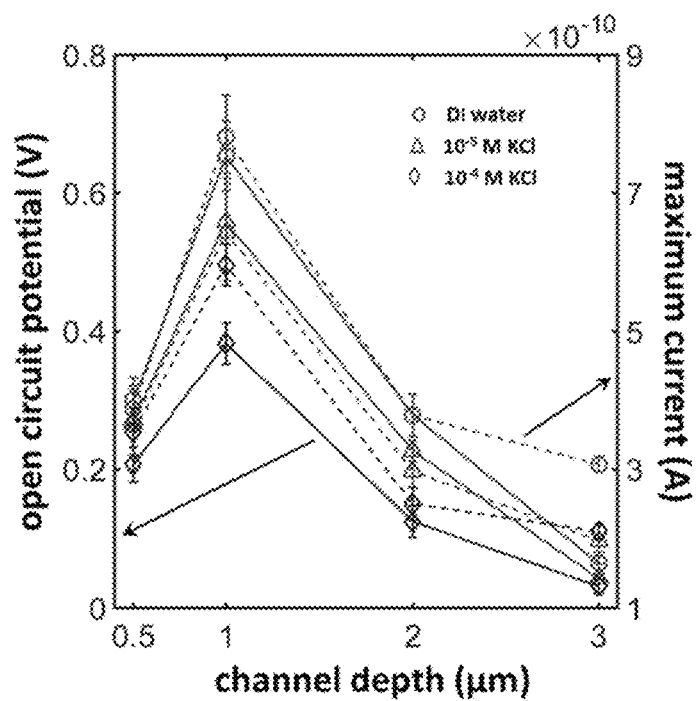
FIG. 21A is a plot of observed variation in the open circuit potential (solid lines) and maximum current (dotted lines) produced by an exemplary microfluidic electrochemical cell with indicated microfluidic channel depth and indicated salt concentration. The error bars in this data are estimated based on 5 independent measurements.
Figure 21B:
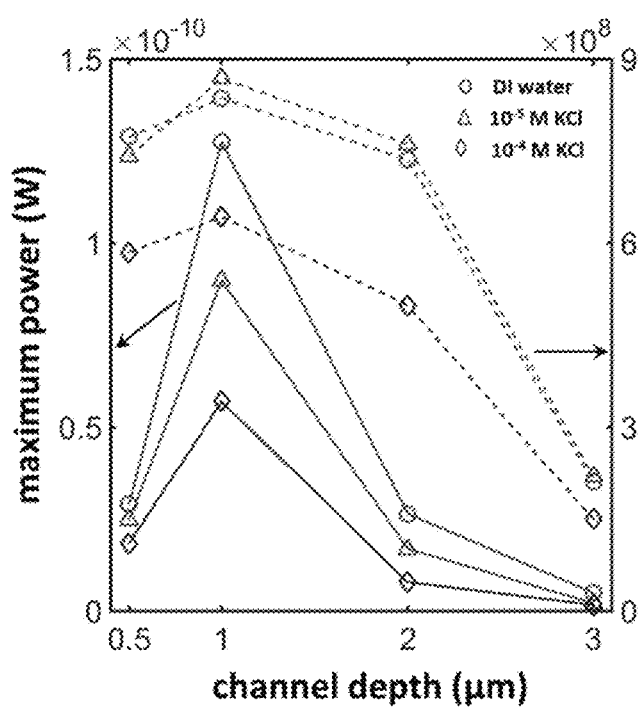
FIG. 21B is a plot of maximum electrical power output yielded by an exemplary microfluidic electrochemical cell (solid lines) and its electrical resistance (dotted lines) as estimated based on the measurements included in FIG. 21A.

Having established the spontaneous capillary flow in exemplary system, we proceed to assess its ability to generate electrical power. To this end, we first describe the stability in the electrical energy output of exemplary microfluidic electrochemical system over a time scale on the order of several hours. In FIG. 4A, we include data obtained from these measurements that are performed in a 1 µm deep channel using deionized water or a KCl solution as the electrolyte medium. Note that of the 4 channels fabricated on the exemplary microfluidic electrochemical cell only one is used at a time for carrying out the measurements described in the following exemplary experiment. No electrodes are placed at the reservoir end of the remaining channels to eliminate them from the electrical circuitry involved in the measurement. The figure shows that the open circuit potential recorded for the exemplary microfluidic electrochemical cell varies by less than 4% for over 3 hrs establishing the temporal steadiness in its electrical performance. We then characterize the current-voltage relationship for the exemplary microfluidic electrochemical cell to quantitatively determine its electrical power output. In FIG. 4B, we present the electrical current measured at its terminals as a function of the voltage developed across them as recorded by the electrochemical analyzer in the set-up. In this situation, the x-intercept in the graph corresponds to the open circuit potential for the system and the y-intercept provides a measure for the maximum current produced by it when the external load in the circuit is zero. The figure shows a linear variation between this current and voltage upon transporting KCl solutions of different concentrations through a 1 µm deep channel. These voltages and currents are also seen to diminish with increasing salt concentrations in the electrolyte medium in agreement with other streaming current/potential studies reported in the literature. In fact, exemplary experiments showed a decrease in the electrical power output of the exemplary system by over a factor of 2 (127 versus 57 pW) going from deionized water to a 0.1 mM KCl solution. FIG. 21A presents a detailed study of the open circuit potential and maximum current measurements for an exemplary microfluidic electrochemical system as a function of the channel depth and salt concentration highlighting a maximum in both these quantities for all electrolytes when d=1 µm. The noted trend is qualitatively consistent with theory which predicts the open circuit potential to scale with the flow velocity in the channel[23]. Based on these measurements, the maximum electrical power output of an exemplary microfluidic electrochemical system is estimated in FIG. 21B as the product of the open circuit potential and the maximum current in the system divided by a factor 4 that is again seen to maximize at d=1 µm. Similarly, the Ohmic resistance of the channel in an exemplary microfluidic electrochemical system is calculated as the ratio of this recorded open circuit potential and maximum current which shows a sharp decline in its magnitude for larger channel depths. The minor increase in the Ohmic resistance going from a 0.5 µm to a 1 µm deep channel as noticed in the exemplary results is likely a result of the dominating effect of surface conductance in the system often observed when low conducting electrolytes are filled in glass conduits. The present exemplary systems, method, experiments, an results clearly establish the feasibility for developing fluidic batteries that can be run by spontaneous capillary flow.

Figure 23A:
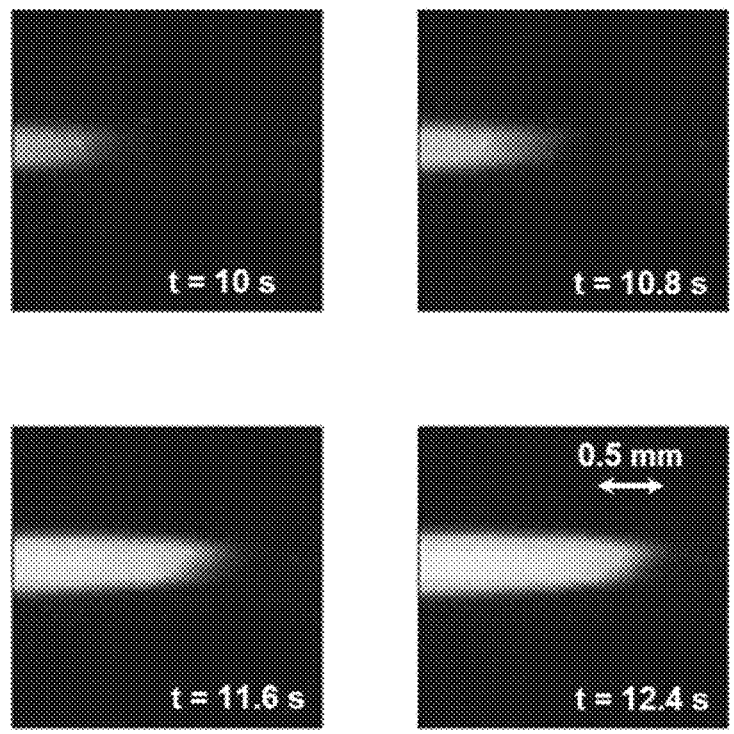
FIG. 23A is a set of fluorescence images of a traveling Rhodamine B front in a 1 µm deep channel driven by spontaneous capillary flow.
Figure 23B:
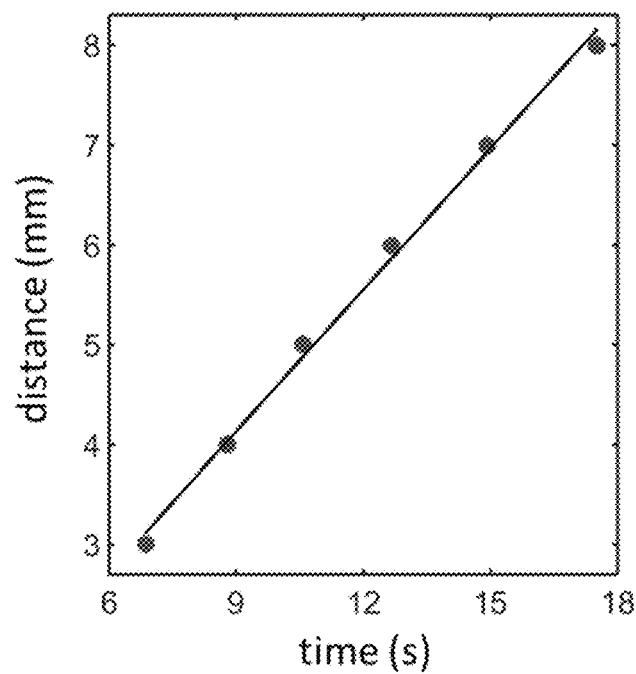
FIG. 23B is a plot of distance traveled by the Rhodamine B front through a 1 µm deep channel as a function of time. The images/data shown in the figure are obtained using a 10 µM solution of Rhodamine B prepared in deionized water.

Detailed characterization of spontaneous capillary flow and electrical energy generation in an individual bare as well as surface modified glass channel under different exemplary operating conditions:

Certain exemplary observations suggest that the liquid meniscus at an open channel end of an exemplary microfluidic electrochemical system may, in some cases, be prevented from proceeding beyond the edge of the conduit (see FIG. 22A). This feature of certain exemplary microfluidic electrochemical systems, although it allowed us realize a small radius of curvature at the gas-liquid interface and thereby a large capillary pressure, it restricted the surface area where solvent evaporation occurred. As a result, the maximum volumetric flow rate we may be able to realize in certain exemplary microfluidic electrochemical systems may be less than $4\times10^{-4}$ µL/s. Spontaneous capillary flow may also be achieved by allowing the solvent to evaporate outside of the microfluidic channel around the bottom corner of a reservoir (e.g., millimeter sized). This exemplary embodiment can increase volumetric flow rates to over 3 times greater (~$1.3\times10^{-3}$ µL/s) than in certain exemplary embodiments with channels of comparable cross-sectional areas (~500 µm$^2$). Further exemplary microfluidic electrochemical systems may employ large evaporation surface areas and a small radius of curvature at the gas-liquid interface using the channel terminal design shown in FIGS. 22B-22C. In this exemplary system, the fluidic duct transporting the electrolyte medium may terminate in a millimeter sized reservoir that has grooves with gap widths on the order of 1-10 µm etched on its bottom surface. Note that the electrolyte may be filled to a height of about a few millimeters in the upstream reservoir having a diameter on the order of 5 mm. This may lead to a radius of curvature of about the same length scale minimizing capillary pressure at this channel end and promoting spontaneous capillary flow in the desired direction. The fluid flow in the exemplary system may be characterized by tracing the leading edge of a Rhodamine B solution as in exemplary preliminary experiments. In FIGS. 23A-23B, we include some representative images from such experiments performed as part of exemplary work and have plotted the position of the leading edge of the dye solution as a function of time allowing estimation of the liquid velocity in the fluidic duct. As may be seen, the positon of the dye interface advanced at a steady rate in exemplary experiments yielding flow velocities on the order of 0.1 mm/s. In exemplary systems, the dimensions of the groves as well as that of the microchannel may be optimized in an effort to maximize this liquid flow velocity. The contact angle of the electrolyte in these grooves may be measured using an optical tensiometer. For these measurements it may be necessary to slice the cross-section of the bottom surface of the reservoir and seal its edges with a glass slide using a UV curable adhesive. To enable the streaming potential/current measurement in these exemplary systems, silver electrodes may be deposited in a small area around the interface of the channel edge and the grooved reservoir using a dual metal evaporator employing Cr as an adhesive layer for the electrode. Small amounts of silver chloride paste may later be deposited on these electrodes to realize the Ag/AgCl electrode system. The flow measurements thus made may be correlated to the electrical performance of exemplary microfluidic electrochemical systems characterized under different ambient temperature and relative humidity. In addition the effect of air flow over the reservoir on the solvent evaporation rate and thereby on the electrical power output of the exemplary system may be assessed. In order to allow significant increases in the liquid flow rate using such air flow, the height of the reservoir may be, in some cases, about a millimeter or less which can be accomplished by employing millimeter thick glass plates for fabricating exemplary systems. Improvements in the electrical performance of exemplary systems may be achieved by coating its fluidic channel with a coating, such as polybrene-poly(vinyl sulfonate), to increase its surface charge density. Such a coating has been reported to yield relatively large and stable electroosmotic velocity in glass capillaries. Again, the flow characteristics and electrical performance of these coated microchips may be studied using the same procedures as discussed above. The noted exemplary experiments may be performed with deionized water as well as solutions of KCl and LiCl to understand the influence of the nature of electrolyte ions on the charge transport through the system.

Theoretical and computational models for understanding exemplary experimental measurements are described. These models may be based on the work reported by Lynn et al. and may consider the case of a complete meniscus within the grooves at the bottom surface of exemplary downstream reservoir. The contact angles and radius of curvature estimated through experimental measurements may be used to create an air-liquid interface where solvent evaporation occurs. This information together with the knowledge of the ambient temperature (T) and relative humidity may then be used to calculate the rate of evaporation $Q_e$ based on the integral $$Q_e = -\frac{pM_w D}{\rho RT} \int_A \frac{\partial x_A}{\partial \hat{n}} dA$$

where $M_w$ is the molecular weight of water, $D=D(T)$ is the binary diffusion coefficient of water vapor in air, R is the ideal gas constant, and A is the cross sectional area of integration normal to $\hat{n}$. The mass fraction of water vapor in the gas phase ($x_A$) above the liquid meniscus may be estimated based on Raoult's law in these computations.

This evaporation rate multiplied by the surface area may then be compared to the volumetric flow rate measured in exemplary microchannel to account for any liquid permeation into the reservoir walls and/or gaps between the base plate and glass cover plate. The charge transport in the system may be modeled assuming a Poisson-Boltzmann distribution of the ions within the channel. Because exemplary work may use electrolytes with small salt concentrations, the effects of a finite ion size may be neglected. The liquid flow in the system may be simulated based on the Navier-Stokes equation in the limit of zero Reynolds number. The electrolyte may be assumed to be dilute as well as incompressible and the entire system may be treated as isothermal. While a 2-D version of this model may be solved numerically using codes written in MATLAB, we may employ the commercial software COMSOL to solve the 3-D version of the same taking into account the exact details of the reservoir/channel geometry.

The evaporation rate at the downstream channel end may be tuned through deposition of a polyelectrolyte coating on the bottom surface of the corresponding reservoir, for example. Such coatings have been reported to significantly increase the rate of water evaporation on silicon surfaces and thereby have the potential to improve the electrical power output of exemplary microfluidic electrochemical systems. For example, we may employ layers of polydiallyldimethylammonium chloride (PDADMA, MW 65 kDa) which may be deposited in the concerned reservoir by simply incubating a 10 mM solution of the polymer prepared in a 0.25 M NaCl medium for an hour under ambient conditions. In order to prevent this solution from entering the microfluidic channel during the incubation period, the fluidic duct may be filled with deionized water after interfacing the upstream reservoir with a syringe to minimize any bulk liquid flow in the channel. While some diffusion of PDADMA may be expected during the coating process, its effect on the performance of exemplary microfluidic electrochemical systems may be insignificant. For these experiments, the grooves on the bottom surface of the downstream reservoir may have to be redesigned particularly in terms of their height to ensure that the PDADMA layer has a chance to significantly influence the solvent evaporation rate in the system. To establish the faster water evaporation rate on PDADMA coating, we may optically image the dimensions and contact angle of water droplets on a glass slide modified with the polyelectrolyte layer similar to that reported by Hanni-Ciunel et al. A faster water evaporation rate on PDADMA layers may occur due to significant reduction in the water contact angle and a respective decrease in the surface energy (by ~7 mJ/m$^2$) on this surface caused by the swelling of the polymer layer. The exemplary measurements described above may be compared to those performed on an unmodified glass slide for reference purposes. In addition, similar experiments may be carried on glass slides with the groove pattern etched onto their surface. This exemplary study may be applied towards establishing the dimensions of the grooves that maximize the water evaporation rate from the surface upon modification by a PDADMA layer. The effect of depositing alternate layers of polystyrene sulfonate and PDADMA with the final layer being that of the cationic polyelectrolyte on the water evaporation rate may also be investigated. The optimum choice for the polyelectrolyte coating and groove pattern may subsequently be incorporated in the downstream reservoir of exemplary microfluidic electrochemical systems to enhance electrical performance.

Figure 6:
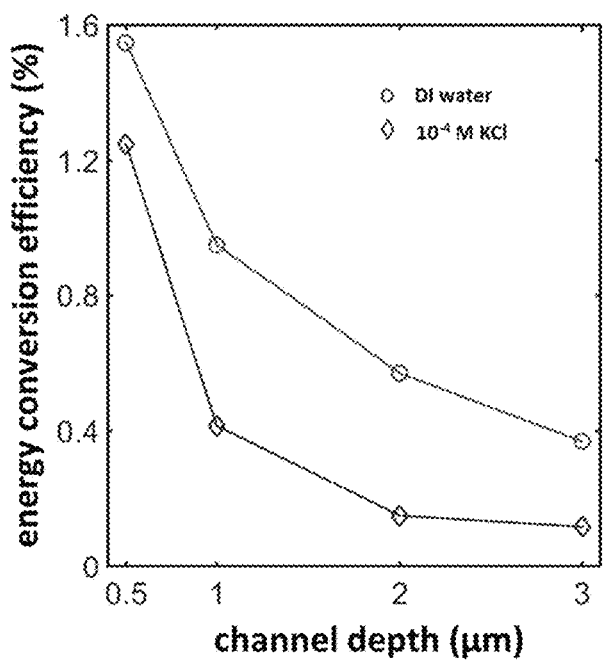
FIG. 6 is a plot showing estimated energy conversion efficiency of the exemplary microfluidic electrochemical cell unit as a function of the microfluidic channel depth and salt concentration in the solvent.

Realization of enhanced energy conversion efficiencies by filling the glass channel in exemplary microfluidic electrochemical systems with highly charged membranes:

For certain exemplary microfluidic electrochemical systems, the efficiency with which mechanical energy of the flowing electrolyte is converted into electrical power may be <2% even for shallow channels (see FIG. 6). This figure-of-merit may be improved by over an order of magnitude by transporting the electrolyte medium through highly charged membranes rather than open conduits. We adopt this strategy for improving the energy conversion efficiency of exemplary microfluidic electrochemical systems by filling glass microchannels with sulfonated membranes. In other exemplary microfluidic electrochemical systems, two different membranes may be employed in exemplary systems. The first of these may be a Nafion membrane, for example, that may be formed within exemplary fluidic microfluidic channel following the solution casting method. To this end, the commercially available Nafion resin (catalog #663492, Sigma Aldrich) may be introduced into the glass conduit and microchip heated in a forced air convection oven at 80° C. for 0.5-1 hr. Different concentrations ranging from 0-20 wt % of the resin may be used in exemplary systems to arrive at a balance between the structural integrity of the formed membrane and its electrical performance. A lower weight percent Nafion solution may be easy to flow through the channel and may form membranes that are uniform across their length. Upon drying however, these membranes may shrink significantly leading to leakages around the channel walls. A higher weight percent Nafion solution on the other hand may be more challenging to flow through the channels leading to the trapping of bubbles and therefore producing structural non-uniformities but would lead to more mechanically robust structures. The resin concentration may significantly influence the hydrodynamic resistance of the membrane as well as its energy conversion efficiency. The drying temperature and period may be tuned to obtain membranes that yield a good balance between their structural consistency and electrical performance. A second kind of membrane to be used in exemplary systems may be formed from blends of nitrocellulose and sulfonated polystyrene (SPS), for example. Such membranes may yield energy conversion efficiencies as high as 46%, or higher. The exemplary membranes may be synthesized again using the solution casting method based on the procedure outlined by Haldrup et al. Briefly, nitrocellulose (3 wt %) may be dissolved in ethanol and ether (50/50 wt %) to which a membrane solution (e.g., SPS) prepared in ethanol may be added dropwise yielding a final SPS content varying between 0-7 g/L (1.3-2.3 wt %). The mixture may be later homogenized by stirring and finally introduced into the microchannel before drying it in a force-air convection oven. The structural consistency of Nafion and SPS membranes may be characterized using optical and SEM imaging. In addition, hydrodynamic resistance may be determined by pumping electrolytes through them using a syringe pump. These exemplary methods shed light into the mechanical stability of the membranes under the influence of a pressure-gradient. The electrical performance of these membrane-containing exemplary microfluidic electrochemical systems may be characterized using an electrochemical analyzer under different operating conditions, e.g., ambient temperature, relative humidity, electrolyte medium (LiCl, KCl, deionized water), etc. The dimensions of the microchannel supporting the membrane structure can be optimized to yield the highest energy conversion efficiency in the exemplary system. To enhance the rate of evaporation of the solvent at the downstream reservoir, its bottom surface may be patterned with grooves as shown in FIG. 22B to realize a small radius of curvature at the air-liquid interface.

The membrane based exemplary microfluidic electrochemical systems developed above may be integrated to a downstream reservoir coated with, for example, polydiallyldimethylammonium chloride (PDADMA). While the polyelectrolyte solution may not significantly penetrate into the hydrated membrane during the selective deposition of PDADMA in the downstream reservoir, modifying the concerned reservoir with the cationic polyelectrolyte prior to forming the Nafion/SPS membrane within the channel may be done. This deposition step may be performed after filling the conduit with water to prevent the entry of the PDADMA solution into it as in task 3 of Specific Aim 1. In this situation, the bottom surface of the reservoir can be be modified by the sulfonated polymers, for example, during the membrane fabrication step. A PDADMA solution may be incubated in the reservoir to realize the desired cationic surface. The electrical power output of these exemplary microfluidic electrochemical systems and the liquid flow with its fluidic duct may be systematically characterized under operating conditions. In the described exemplary microfluidic electrochemical systems, Ag/AgCl electrodes at the two reservoirs may be used to make electrical contact with the electrolyte medium. Such electrodes may be deposited using a dual metal evaporate after laying down a thin layer of Cr on the glass surface as is done in exemplary preliminary experiments. The electrochemical reactions occurring at the cathodic and anodic ends of exemplary system may be represented as $AgCl(s)+e^- \rightarrow Ag(s)+Cl^-(aq)$ and $Ag(s)+Cl^-(aq) \rightarrow AgCl(s)+e^-$ under these conditions.

To alleviate shrinking of the Nafion/SPS membrane during the solvent drying process, which may occur in limited scenarios and which may lead to gaps around the channel walls, coating exemplary channel with N-(Trimethoxysilylpropyl)-N,N,N-trimethylammonium chloride (TTACl) to better adhere the membrane structure to the channel surface may be done. The $TTA^+$ species may electrostatically interact with the Nafion sulfonate sites producing an ionic bond between the layer of TTACl and the membrane. The hydrodynamic resistance may be expected to drop sharply at high pressures when the membrane starts detaching from the channel wall. Fortunately, because the pressure-drop in a spontaneous capillary flow system is expected to be moderate, the use TTACl may provide sufficient mechanical stability for exemplary chosen application.

Figure 24A:
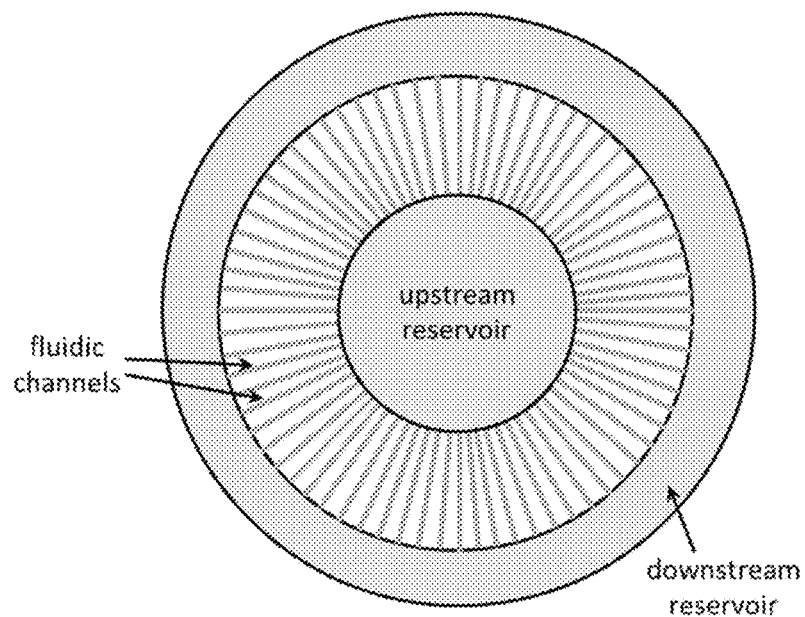
FIG. 24A is an illustration showing an arrangement of fluidic channels in parallel to scale up maximum electrical current generated by an exemplary microfluidic electrochemical cell fabricated on a planar glass plate.
Figure 24B:
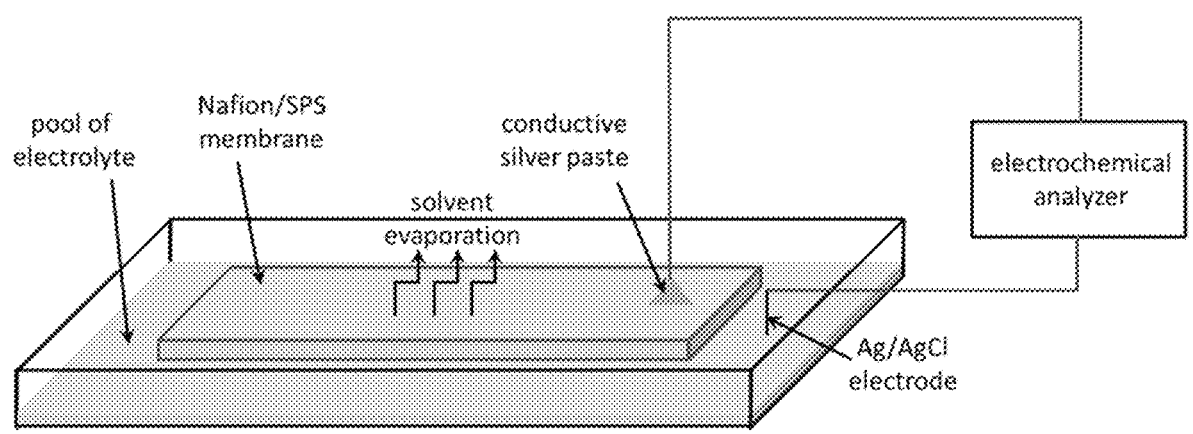
FIG. 24B is an illustration of a set-up for measuring the streaming potential/current developed across a sheet of Nafion/SPS membrane due to spontaneous capillary flow through its pore network.
Figure 25A:
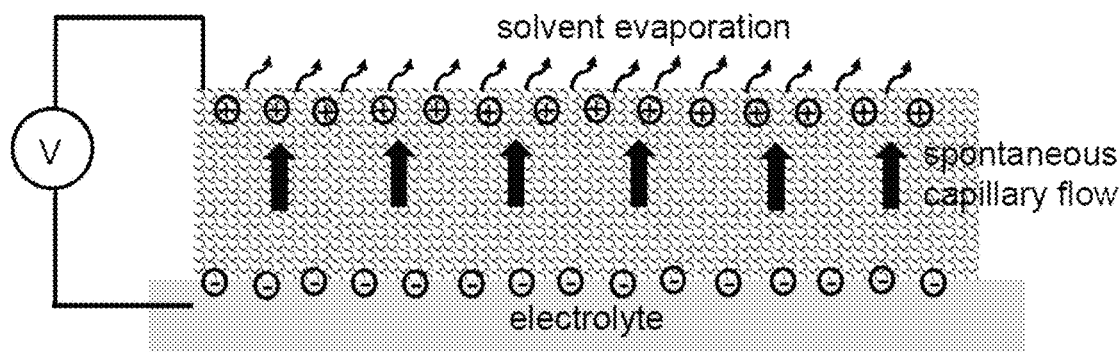
FIG. 25A provides an example in which the solvent flows through a charged membrane.
Figure 25B:
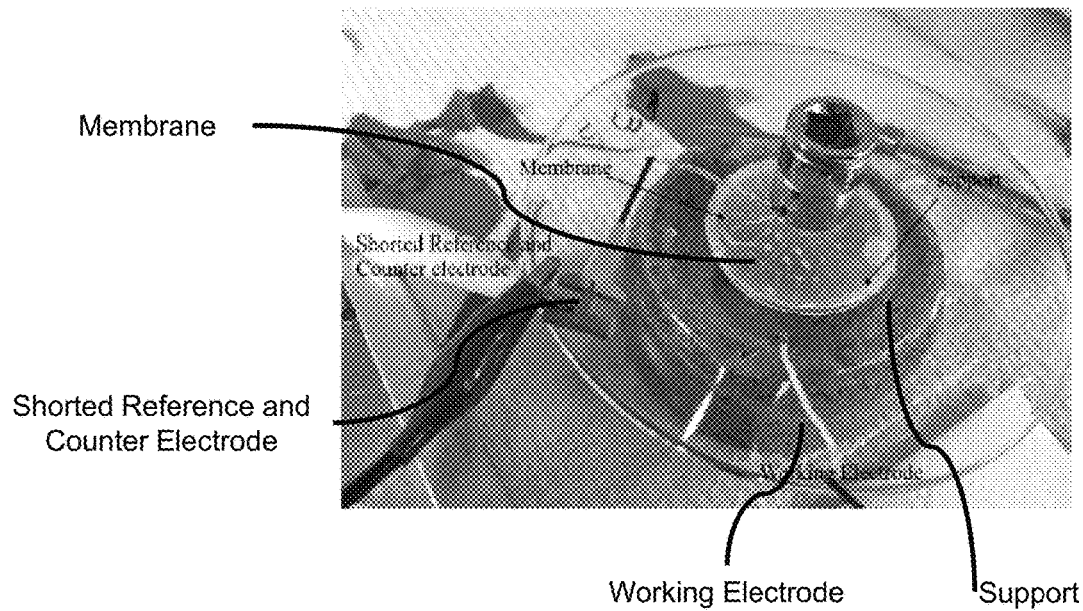
FIG. 25B provides an experimental device using spontaneous capillary flow through a charged membrane. Solvent flow through the membrane leads to a potential difference (e.g. voltage generation) between the inlet and outlet of the membrane.
Figure 26A:
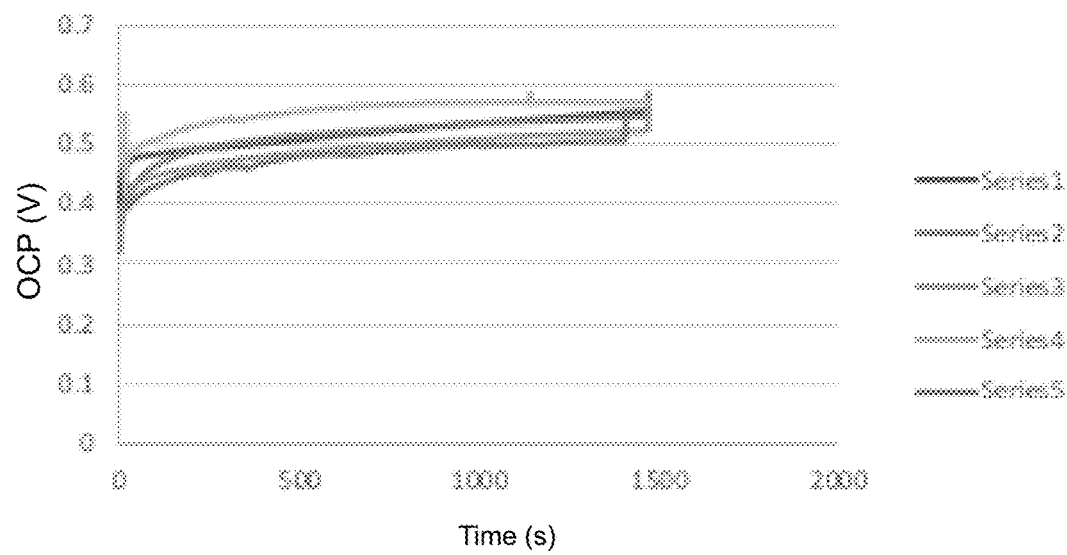
FIG. 26A provides a series of sequential open circuit voltage measurements over time on a 8.5 mm×8.5 mm and 183 µm thick charged membrane, illustrating potential remains quite stable over time.
Figure 26B:
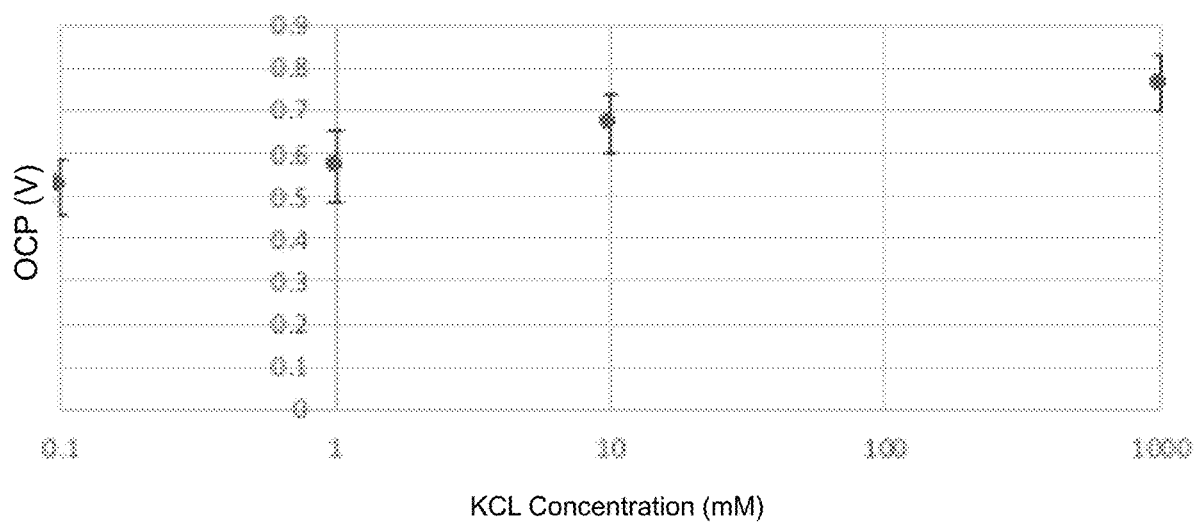
FIG. 26B shows the effect of KCl concentration for flow through a 1 cm×1 cm and 127 µm thick charged membrane with a log scale x-axis. Typical voltages generated are in the range of 0.4-0.8V depending experimental conditions.
Figure 27A:
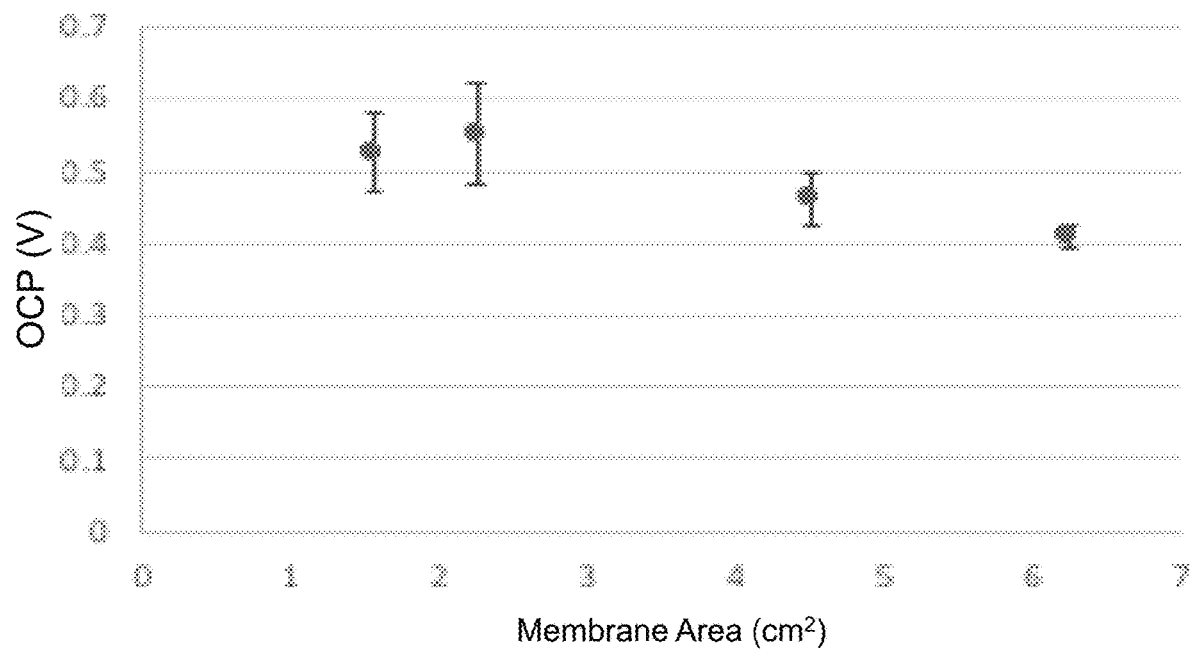
FIG. 27A demonstrates the effect of membrane area on open circuit potential for a 127 µm thick charged membrane.
Figure 27B:
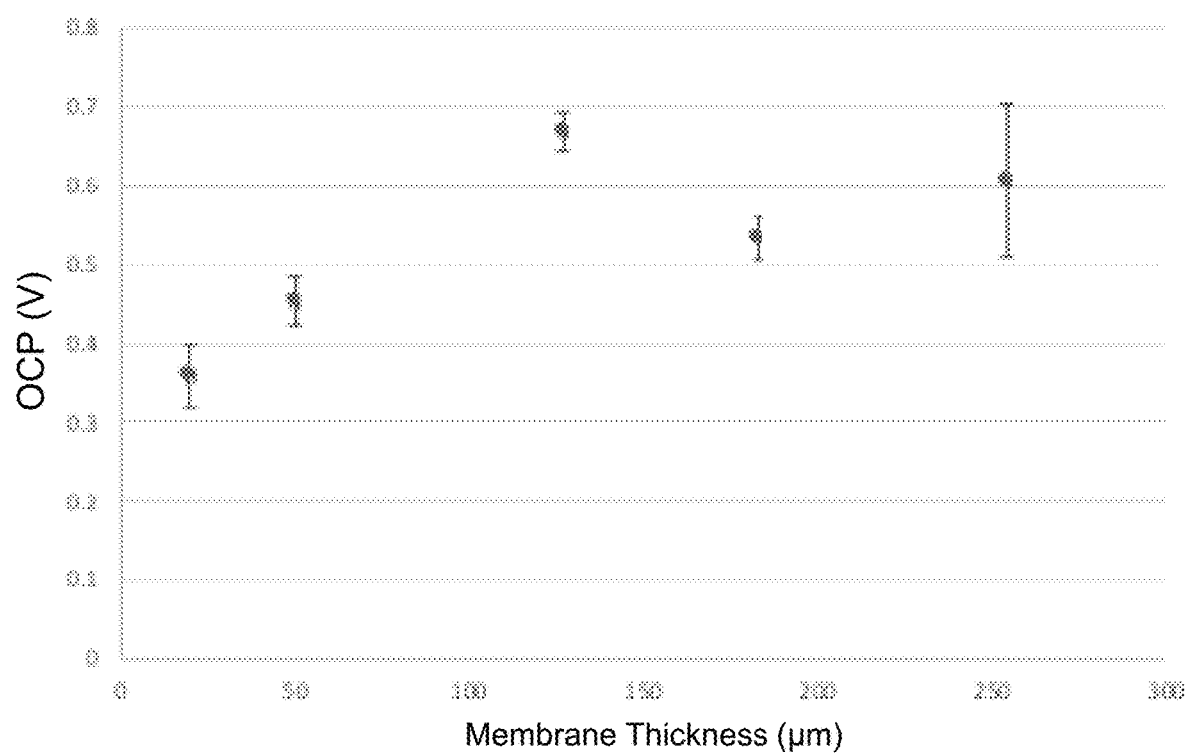
FIG. 27B provides the effect of membrane thickness on open circuit potential. Larger membrane area seems to adversely affect the open circuit voltage. In contrast, increased membrane thickness seems to have a favorable effect.
Figure 28:
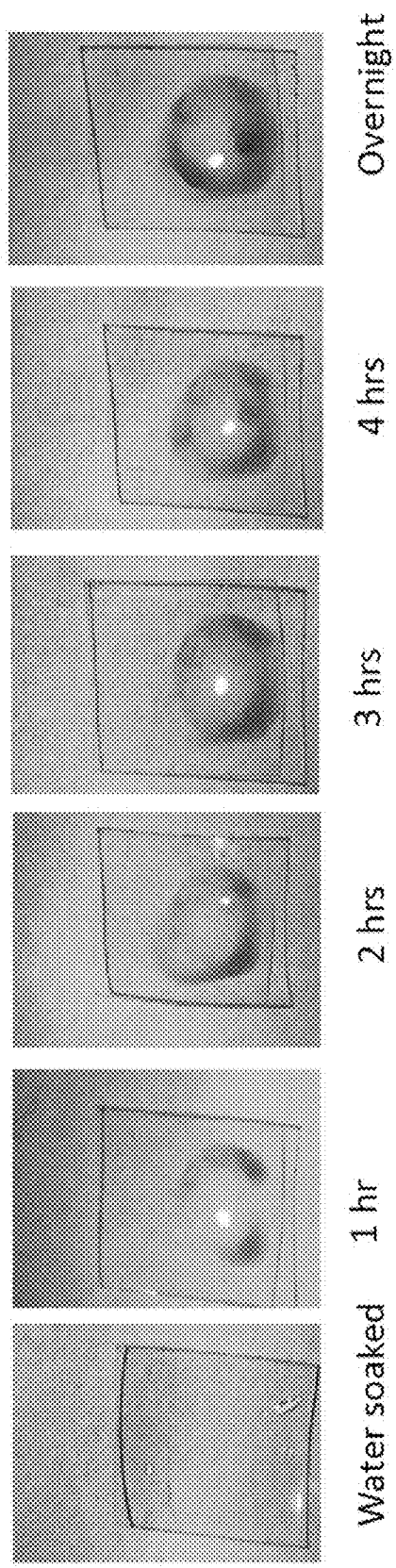
FIG. 28 provides images of a Nafion membrane in the configuration provided in FIG. 25B over time after contact with a dyed electrolyte.
Figure 29:
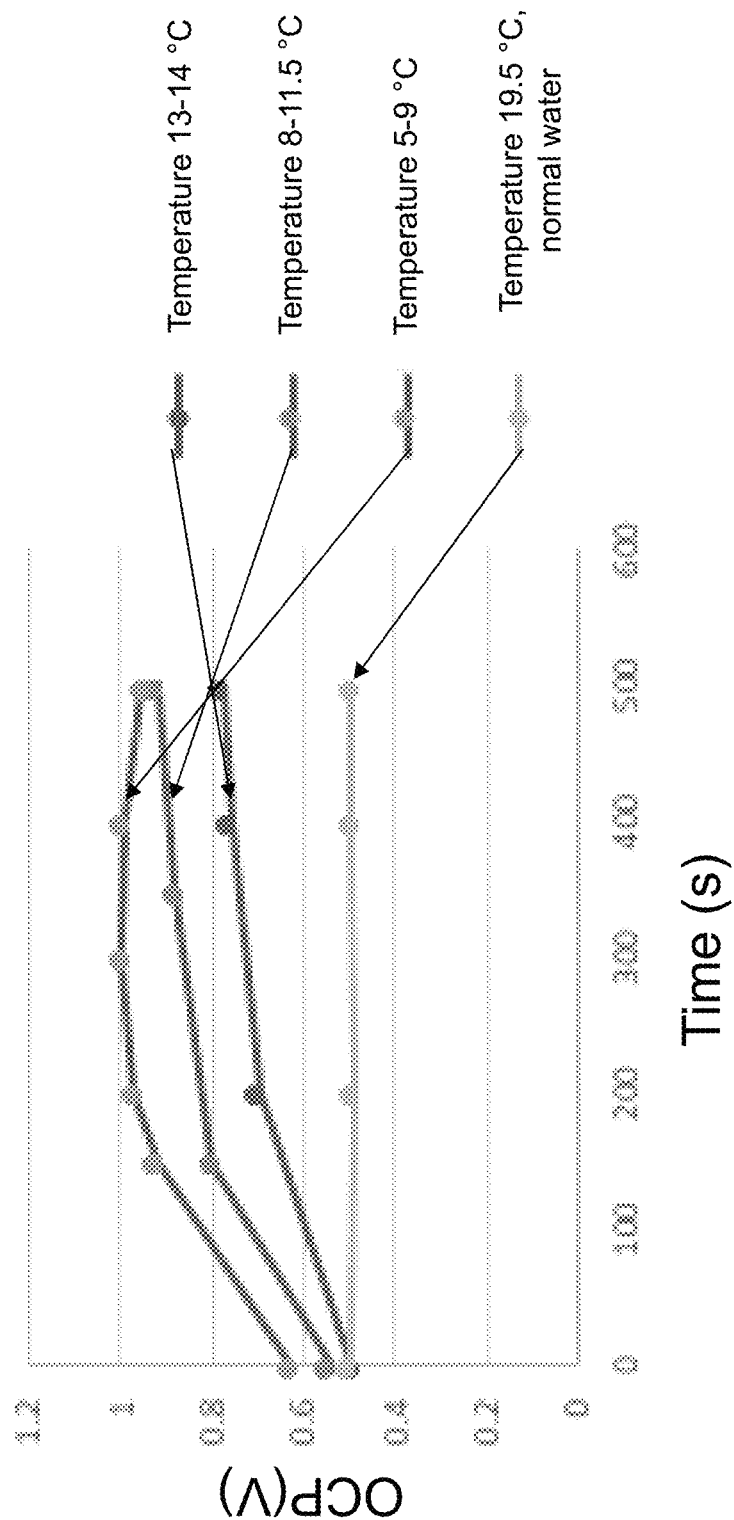
FIG. 29 provides open circuit voltage at various temperatures for a 1 cm×1 cm and 127 µm thick charged membrane. As the temperature is reduced, higher open circuit voltages are observed.
Figure 30:
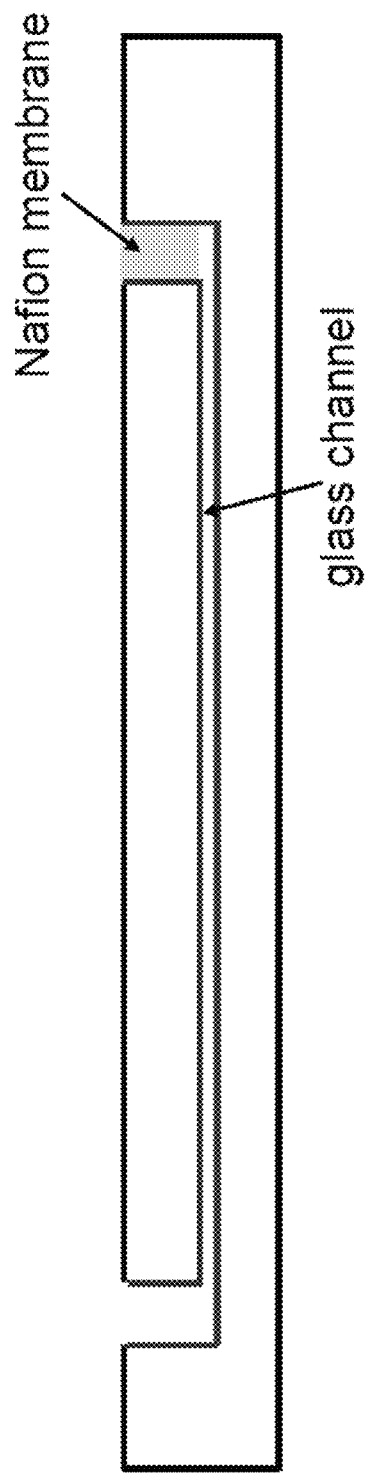
FIG. 30 provides an example of a system specifically designed to introduce gradients (temperature, ion, etc.) across the membrane in a controllable fashion. A potential of 0.6 V is observed prior to inclusion of a gradient, which may increase the open circuit potential.

Scale up of electrical power generated by exemplary microfluidic electrochemical systems employing an array of open/membrane filled glass channels:

The maximum electrical power output of certain exemplary microfluidic electrochemical systems may be about 127 pW, however, other exemplary microfluidic electrochemical system described herein have higher electrical power output. For example, systems with arrangement (e.g., array) of the individual fluidic channels in series and/or parallel have increased electrical power output. The maximum electrical current generated by exemplary microfluidic electrochemical systems is scaled by creating one or more arrays of parallel channels (e.g., glass) transporting the electrolyte medium between the upstream and downstream reservoirs. An exemplary system such as this is shown in FIG. 24A. For example, over 100 channels within a 10 $cm^2$ area, ay be arranged using this approach leading to an increase in the maximum current by 2 or more orders of magnitude. The overall voltage produced by the system may be also scaled up by this approach and such systems. In addition to enabling an increase in the electrical current/voltage generated by these exemplary microfluidic electrochemical system, the exemplary arrangement of the unit shown in FIG. 24A may allow tuning the electrical resistance of a power supply. This may be important for maximizing the transfer of electrical power to an external load run by the exemplary microfluidic electrochemical system. In addition to exemplary microfluidic electrochemical system on planar glass plates, other exemplary microfluidic electrochemical system may be scaled up in electrical current using one or more membrane sheets, such as Nafion/SPS, as shown in FIG. 24B, for example. These exemplary systems yield significantly greater packing density of fluidic paths for the electrolyte medium across the upstream and downstream reservoirs. These other exemplary microfluidic electrochemical systems may lead to the development of spontaneous fluidic batteries that do not require significant fabrication effort rendering their manufacturing cost lower compared to that for the microchip based systems.

The ability of the exemplary microfluidic electrochemical systems shown in FIGS. 24A-24B to charge an external capacitor allowing for storage of electrical energy that may later be used for powering an external device is described. Based on the charging dynamics of the external capacitor, the effective capacitance of exemplary microfluidic electrochemical systems may be estimated as a function of different operating conditions, e.g., temperature, relative humidity, electrolyte concentrations, etc. The charging dynamics of the capacitor may be carefully monitored over multiple days/weeks by periodically measuring the voltage developed across it to assess the long term performance of a fluidic power source. For these exemplary experiments, it may be necessary to build a housing for the exemplary microfluidic electrochemical system that would prevent the deposition of dust particle and other debris into its downstream reservoir without significantly compromising the air flow around it which has a tendency to enhance solvent evaporation in the system.

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it may be apparent to one skilled in the art that the present invention may be carried out using a large number of variations of the devices, device components, methods steps set forth in the present description. As may be obvious to one of skill in the art, methods and devices useful for the present methods can include a large number of optional composition and processing elements and steps.

When a group of substituents is disclosed herein, it is understood that all individual members of that group and all subgroups, including any isomers, enantiomers, and diastereomers of the group members, are disclosed separately. When a Markush group or other grouping is used herein, all individual members of the group and all combinations and subcombinations possible of the group are intended to be individually included in the disclosure. When a compound is described herein such that a particular isomer, enantiomer or diastereomer of the compound is not specified, for example, in a formula or in a chemical name, that description is intended to include each isomers and enantiomer of the compound described individual or in any combination. Additionally, unless otherwise specified, all isotopic variants of compounds disclosed herein are intended to be encompassed by the disclosure. For example, it may be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

Many of the molecules disclosed herein contain one or more ionizable groups [groups from which a proton can be removed (e.g., —COOH) or added (e.g., amines) or which can be quaternized (e.g., amines)]. All possible ionic forms of such molecules and salts thereof are intended to be included individually in the disclosure herein. With regard to salts of the compounds herein, one of ordinary skill in the art can select from among a wide variety of available counterions those that are appropriate for preparation of salts of this invention for a given application. In specific applications, the selection of a given anion or cation for preparation of a salt may result in increased or decreased solubility of that salt.

Every formulation or combination of components described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. It may be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, reagents, synthetic methods, purification methods, analytical methods, and assay methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

I claim:

1. A microfluidic electrochemical system comprising:
a fluid inlet for introduction of an aqueous solvent;
a microfluidic channel in fluid communication with said fluid inlet;
wherein said microfluidic channel has charged walls; and
wherein said microfluidic channel has an average length of greater than or equal to 1 µm and an effective cross sectional diameter of less than or equal to 10 µm;
wherein said microfluidic channel comprises a charged membrane positioned along a surface of said microfluidic channel; and
an evaporation chamber in fluid communication with said microfluidic channel;
wherein evaporation of said solvent in said evaporation chamber drives flow of said solvent through said microfluidic channel due to capillary force thereby generating an electrical current flowing through said solvent in the direction of said microfluidic channel.

2. The system of claim 1 further comprising a first electrode positioned proximate to said fluid inlet and a second electrode positioned proximate to said evaporation chamber.

3. The system of claim 1 further comprising a plurality of fluid inlets operably connected to a plurality of microfluidic channels operably connected to at least one evaporation chamber configured to form a microfluidic channel array;
wherein said array is configured such that evaporation of said solvent in said at least one evaporation chamber drives flow of said solvent through each of said microfluidic channels due to capillary force thereby generating an electrical current flowing through each of said microfluidic channels.

4. The system of claim 3 further comprising a plurality of evaporation chambers;
wherein each of said microfluidic channels is in fluidic communication with an individual evaporation chamber.

5. The system of claim 1, wherein said charged membrane is a sulfonated membrane.

6. The system of claim 1, wherein said charged membrane is Nafion, a sulfonated polystyrene membrane or any combination thereof.

7. The system of claim 1, wherein said microfluidic channel is supported by or embedded in a substrate.

8. The system of claim 7, wherein said substrate is a glass plate, a borosilicate glass plate, silicon, a polymer or a combination thereof.

9. The system of claim 1, wherein said solvent is selected from the group consisting of: water, deionized water; NaCl, KCl, LiCl, methanol, ethanol any combination thereof.

10. A microfluidic electrochemical system comprising:
a fluid inlet for introduction of an aqueous solvent;
a microfluidic channel in fluid communication with said fluid inlet;
wherein said microfluidic channel has charged walls; and
wherein said microfluidic channel has an average length of greater than or equal to 1 µm and an effective cross sectional diameter of less than or equal to 10 µm;
wherein said microfluidic channel comprises a charged membrane positioned along a surface of said microfluidic channel; and
an evaporation chamber in fluid communication with said microfluidic channel;
wherein said evaporation chamber further comprises a polyelectrolyte coating to increase a rate of evaporation of said solvent;
wherein evaporation of said solvent in said evaporation chamber drives flow of said solvent through said microfluidic channel due to capillary force thereby generating an electrical current flowing through said solvent in the direction of said microfluidic channel.

11. The system of claim 10, wherein said polyelectrolyte coating is polydiallyldimethylammonium chloride (PDADMA).

12. The system of claim 1, wherein said evaporation chamber further comprises a patterned surface to increase the rate of evaporation of said solvent.

13. The system of claim 1, wherein said microfluidic channel is configured to provide a gradient along the axial length of said microfluidic channel.

14. The system of claim 3, wherein said microfluidic channel array is configured to provide a gradient along the axial length of said plurality of microfluidic channels.

15. The system of claim 14, wherein said gradient is a temperature gradient or an ionic concentration gradient.

16. A microfluidic electrochemical system comprising:
a fluid inlet for introduction of an aqueous solvent;
a microfluidic channel array comprising:
a plurality of fluid inlets for introduction of an aqueous solvent;
a plurality of microfluidic channels each in fluid communication with said fluid inlet;

wherein each of said microfluidic channels has charged walls; and wherein each of said microfluidic channels has an average length of greater than or equal to 1 μm and an effective cross sectional diameter of less than or equal to 10 μm;

wherein said microfluidic channel array is configured to provide a gradient along an axial length of said plurality of microfluidic channels;

a charged membrane in fluid communication with said microfluidic channel array;

an evaporation chamber in fluid communication with said microfluidic channel;

wherein evaporation of said solvent in said evaporation chamber drives flow of said solvent through said microfluidic channel due to capillary force thereby generating an electrical current flowing through said solvent in the direction of said microfluidic channel.

17. The system of claim 16, wherein said microfluidic channel array is configured to provide a gradient across said charged membrane.

18. The system of claim 16, wherein said gradient is a temperature gradient or an ion concentration gradient.

19. The system of claim 16, wherein said charged membrane is Nafion, a sulfonated polystyrene membrane or any combination thereof.

20. The system of claim 16, wherein said charged membrane is positioned proximate to said evaporation chamber.

21. A microfluidic electrochemical system comprising:

a fluid inlet for introduction of an aqueous solvent;

a charged membrane supported by a substrate and in fluid communication with said fluid inlet; wherein said substrate is configured to provide a gradient along a flow path of said charged membrane;

an evaporation chamber in fluid communication with said charged membrane;

wherein evaporation of said solvent in said evaporation chamber drives flow of said solvent charged membrane along said flow path due to capillary force thereby generating an electrical current flowing through said solvent in the direction of said flow path.

22. The system of claim 21, wherein said gradient is a temperature gradient or an ion concentration gradient.

* * * * *